(12) United States Patent
Karras et al.

(10) Patent No.: US 12,321,825 B2
(45) Date of Patent: Jun. 3, 2025

(54) TRAINING NEURAL NETWORKS WITH LIMITED DATA USING INVERTIBLE AUGMENTATION OPERATORS

(71) Applicant: NVIDIA Corporation, Santa Clara, CA (US)

(72) Inventors: Tero Tapani Karras, Helsinki (FI); Miika Samuli Aittala, Helsinki (FI); Janne Johannes Hellsten, Helsinki (FI); Samuli Matias Laine, Vantaa (FI); Jaakko T. Lehtinen, Helsinki (FI); Timo Oskari Aila, Tuusula (FI)

(73) Assignee: NVIDIA Corporation, Santa Clara, CA (US)

( * ) Notice: Subject to any disclaimer, the term of this patent is extended or adjusted under 35 U.S.C. 154(b) by 1081 days.

(21) Appl. No.: 17/210,934

(22) Filed: Mar. 24, 2021

(65) Prior Publication Data

US 2021/0383241 A1    Dec. 9, 2021

Related U.S. Application Data

(60) Provisional application No. 63/035,448, filed on Jun. 5, 2020.

(51) Int. Cl.
*G06N 20/00* (2019.01)
*G06T 1/60* (2006.01)
(52) U.S. Cl.
CPC ............. *G06N 20/00* (2019.01); *G06T 1/60* (2013.01)
(58) Field of Classification Search
CPC .................................. G06N 20/00; G06T 1/60
See application file for complete search history.

(56) References Cited

U.S. PATENT DOCUMENTS

2017/0351952 A1    12/2017  Zhang et al.
2018/0019388 A1     1/2018  Fukami et al.
(Continued)

FOREIGN PATENT DOCUMENTS

CN     109313724 A    2/2019
CN     110059793 A    7/2019
(Continued)

OTHER PUBLICATIONS

Zhao, S., Liu, Z., Lin, J., Zhu, J. Y., & Han, S. (2020). Differentiable augmentation for data-efficient gan training. Advances in neural information processing systems, 33, 7559-7570. (Year: 2020).*

(Continued)

*Primary Examiner* — Brian M Smith
(74) *Attorney, Agent, or Firm* — Leydig, Voit & Mayer, Ltd.

(57) ABSTRACT

Embodiments of the present disclosure relate to a technique for training neural networks, such as a generative adversarial neural network (GAN), using a limited amount of data. Training GANs using too little example data typically leads to discriminator overfitting, causing training to diverge and produce poor results. An adaptive discriminator augmentation mechanism is used that significantly stabilizes training with limited data providing the ability to train high-quality GANs. An augmentation operator is applied to the distribution of inputs to a discriminator used to train a generator, representing a transformation that is invertible to ensure there is no leakage of the augmentations into the images generated by the generator. Reducing the amount of training data that is needed to achieve convergence has the potential to considerably help many applications and may the increase use of generative models in fields such as medicine.

20 Claims, 17 Drawing Sheets

(56) References Cited

U.S. PATENT DOCUMENTS

| | | | |
|---|---|---|---|
| 2018/0101784 | A1 | 4/2018 | Rolfe et al. |
| 2019/0114544 | A1 | 4/2019 | Sundaram et al. |
| 2019/0130278 | A1 | 5/2019 | Karras et al. |
| 2019/0373293 | A1* | 12/2019 | Bortman ............... H04N 19/176 |
| 2020/0090045 | A1 | 3/2020 | Baker |
| 2021/0201078 | A1* | 7/2021 | Yao .......................... G06N 3/08 |
| 2021/0216860 | A1* | 7/2021 | Poghosyan ............ G06N 5/046 |

FOREIGN PATENT DOCUMENTS

| | | |
|---|---|---|
| CN | 110800062 A | 2/2020 |
| CN | 110892417 A | 3/2020 |
| CN | 111145106 A | 5/2020 |
| WO | 2016159017 A1 | 10/2016 |

OTHER PUBLICATIONS

Shao, S., Wang, P., & Yan, R. (2019). Generative adversarial networks for data augmentation in machine fault diagnosis. Computers in Industry, 106, 85-93. (Year: 2019).*
Inoue, H. (2018). Data augmentation by pairing samples for images classification. arXiv preprint arXiv:1801.02929. (Year: 2018).*
Tran, N. T., Tran, V. H., Nguyen, N. B., Nguyen, T. K., & Cheung, N. M. (2020). Towards good practices for data augmentation in gan training. arXiv preprint arXiv:2006.05338, 2(3), 3. (Year: 2020).*
Yadav, S. S., & Jadhav, S. M. (2019). Deep convolutional neural network based medical image classification for disease diagnosis. Journal of Big data, 6(1), 1-18. (Year: 2019).*
Zhao, Z., Zhang, Z., Chen, T., Singh, S., & Zhang, H. (2020). Image augmentations for gan training. arXiv preprint arXiv:2006.02595. (Year: 2020).*
Ching, C. W., Lin, T. C., Chang, K. H., Yao, C. C., & Kuo, J. J. (Dec. 2020). Model partition defense against gan attacks on collaborative learning via mobile edge computing. In GLOBECOM 2020—2020 IEEE Global Communications Conference (pp. 1-6). IEEE. (Year: 2020).*
Zhang, M. et al., "DeepRoad: GAN-Based metamorphic testing and input validation framework for autonomous driving systems," 2018 33rd IEEE/ACM Intl. Conf. on Automated Software Engineering (Sep. 2018) pp. 132-142. (Year: 2018).*
Aksac, A., et al., "BreCaHAD: A dataset for breast cancer histopathological annotation and diagnosis," BMC Research Notes, 12, 2019.
Arjovsky, M., et al., "Towards principled methods for training generative adversarial networks," In Proc. ICLR, 2017.
Binkowski, M., et al., "Demystifying MMD GANs," In Proc. ICLR, 2018.
Bora, A., et al., "AmbientGAN: Generative models from lossy measurements," In Proc. ICLR, 2018.
Brock, A., et al., "Large Scale GAN training for high fidelity natural image synthesis," In Proc. ICLR, 2019.
Chen, T., et al., "Self-supervised GANs via auxiliary rotation loss," In Proc. CVPR, 2019.
Choi, Y., et al., "StarGAN v2: Diverse image synthesis for multiple domains," In Proc CVPR, 2020.
Cubuk, E.D., et al., "AutoAugment: Learning augmentation strategies from data," In Proc. CVPR, 2019.
Cubuk, E.D., et al., "Rand Augment: Practical automated data augmentation with a reduced search space," CoRR, abs/1909.13719, 2019.
DeVries, T., et al., "Improved regularization of convolutional neural networks with cutout," CoRR, abs/1708.04552, 2017.
Gong, X., et al., "AutoGAN: Neural architecture search for generative adversarial networks," In Proc. ICCV, 2019.

Goodfellow, I., et al., "Generative adversarial nets," In Proc. NIPS, 2014.
Gulrajani, I., et al., "Improved training of Wasserstein GANs," In Proc. NIPS, pp. 5769-5779, 2017.
Gurumurthy, S., et al., "DeLiGAN: Generative adversarial networks for diverse and limited data," In Proc. CVPR, 2017.
He, T., et al., "Bag of tricks for image classification with convolutional neural networks," In Proc. CVPR, 2019.
Heusel, M., "GANs trained by a two time-scale update rule converge to a local Nash equilibrium," In Proc. NIPS, 2017.
Karras, T., et al., "Progressive growing of GANs for improved quality, stability and variation," In Proc. ICLR, 2018.
Karras, T., et al., "A style-based generator architecture for generative adversarial networks," In Proc. CVPR, 2018.
Karras, T., et al., "Analyzing and improving the image quality of StyleGAN," In Proc. CVPR, 2020.
Kavalerov, W., et al., "cGANs with multi-hinge loss," CoRR, abs/1912.04216, 2019.
Krizhevsky, A., "Learning multiple layers of features from tiny images," Technical report, University of Toronto, 2009.
Laine, S., et al., "Temporal ensembling for semi-supervised learning," In Proc., ICLR, 2017.
Miyato, T., et al., "Spectral normalization for generative adversarial networks," In Proc. ICLR, 2018.
Miyato, T., et al., "cGANs with projection discriminator," In Proc. ICLR, 2018.
Mo, S., et al., "Freeze the discriminator: a simple baseline for fine-tuning GANs," CoRR, abs/2002.10964, 2020.
Noguchi, A., et al., "Image generation from small datasets via batch statistics adaptation," In Proc. ICCV, 2019.
Sajjadi, M., et al., "Regularization with stochastic transformations and perturbations for deep semi-supervised learning," In Proc. NIPS, 2016.
Salimans, T., et al., "Improved techniques for training GANs," In Proc., NIPS, 2016.
Schonfeld, E., et al., "A U-net based discriminator for generative adversarial networks," CoRR, abs/2002.12655, 2020.
Sendik, O., et al., "Unsupervised multi-modal styled content generation," CoRR, abs/2001.03640, 2020.
Shorten, C., et al., "A survey on image data augmentation for deep learning," Journal of Big Data, 6, 2019.
Sonderby, C., et al., "Amortised MAP inference for image super-resolution," In Proc. ICLR, 2017.
Srivastava, N., et al., "Dropout: A simple way to prevent neural networks from overfitting," Journal of Machine Learning Research, 15:1929-1958, 2014.
Wang, Y., et al., "MineGAN: Effective knowledge transfer from GANs to target domains with few images," In Proc. CVPR, 2020.
Yi, X., et al., "Generative adversarial network in medical imaging: A review." Medical Image Analysis, 58, 2019.
Zhang, D., et al., "PA-GAN: Improving GAN training by progressive augmentation," In Proc. NeurIPS, 2019.
Zhang, H., et al., "Consistency regularization for generative adversarial networks," In Proc. ICLR, 2019.
Zhao, Y., et al., "Feature quantization improves GAN training," CoRR abs/2004.02088, 2020.
Zhao, Z., et al., "Improved consistency regularization for GANs," CoRR, abs/2002.04724, 2020.
Berthelot, D., et al., "BEGAN: Boundary Equilibrium Generative Adversarial Networks," arXiv:1703.10717v4, May 31, 2017.
Zhao, S., et al., "Differentiable Augmentation for Data-Efficient GAN Training," arXiv:2006.10738v4, Dec. 7, 2020.
Zhao, Z., et al., "Image Augmentations for GAN Training," arXiv:2006.02595v1, Jun. 4, 2020.

\* cited by examiner

TRAINING NEURAL NETWORKS WITH LIMITED DATA USING INVERTIBLE AUGMENTATION OPERATORS

CLAIM OF PRIORITY

This application claims the benefit of U.S. Provisional Application No. 63/035,448 titled "Training Generative Adversarial Networks with Limited Data," filed Jun. 5, 2020, the entire contents of which is incorporated herein by reference.

BACKGROUND

Large amounts of training data are needed to adequately train a generative adversarial neural network (GAN) to perform well, for example, to generate realistic images. Training GANs using too little data typically leads to discriminator overfitting, where the discriminator's feedback to the generator becomes meaningless, causing training to diverge instead of converge. Unfortunately, large amounts of training data may be difficult to provide. Collecting a large enough set of images for a specific application that places constraints on subject type, image quality, geographical location, time period, privacy, copyright status, etc. can be challenging. The difficulties are further exacerbated in applications that require the capture of a new, custom dataset: acquiring, processing, and distributing as many as a million or more images required to train a modern high-quality, high-resolution GAN is a costly undertaking.

In almost all areas of deep learning, dataset augmentation provides additional training data and is the standard solution against overfitting. For example, training an image classifier under rotation, noise, etc., leads to increasing invariance to these semantics-preserving distortions—a highly desirable quality in a classifier. In contrast, a GAN trained under similar dataset augmentations learns to generate the augmented distribution. In general, such "leaking" of augmentations to the generated images is highly undesirable. For example, a noise augmentation leads to noisy results, even if there is no noise in the dataset. In other words, the generator learns to generate images that include the augmentations. There is a need for addressing these issues and/or other issues associated with the prior art.

SUMMARY

Embodiments of the present disclosure relate to a technique for training neural networks, such as a generative adversarial neural network (GAN), using a limited amount of data. Depending on the task, data generated by the GAN may include images, audio, video, three-dimensional (3D) objects, text, etc. Training GANs using too little example data typically leads to discriminator overfitting, causing training to diverge. To avoid divergence during training, an adaptive discriminator augmentation mechanism is used that significantly stabilizes training in limited data regimes. The adaptive discriminator augmentation mechanism does not require changes to loss functions or network architectures and is applicable both when training from scratch and when fine-tuning an existing GAN on another dataset. An augmentation operator that is applied to the distribution of inputs to a discriminator represents a transformation that is invertible to ensure there is no leakage of the augmentations into images generated by a generator being trained by the discriminator. Reducing the amount of training data that is needed to achieve convergence has the potential to considerably help many applications. For example, reducing the amount of training data that is needed may the increase the use of generative models in fields such as medicine.

A method, computer readable medium, and system are disclosed for training neural networks using a limited amount of data. A neural network receives training data including input data and ground truth outputs, where the input data is associated with a first distribution. At least one augmentation is applied to the input data to produce augmented input data associated with a second distribution, where an augmentation operator corresponding to a transformation from the first distribution to the second distribution is invertible and specifies the at least one augmentation. The augmented input data is processed by the neural network according to parameters to produce output data and the parameters are adjusted to reduce differences between the output data and the ground truth outputs.

BRIEF DESCRIPTION OF THE DRAWINGS

The present systems and methods for adaptive augmentation are described in detail below with reference to the attached drawing figures, wherein.

DETAILED DESCRIPTION

Systems and methods are disclosed related to training neural networks, such as generative adversarial networks, using limited amounts of data. First, a better understanding of how the quantity of available training data affects GAN training is needed. Then a comprehensive analysis of the conditions that prevent the augmentations from leaking is described. A diverse set of augmentations may then be provided, and an adaptive control scheme enables a consistent solution to be used regardless of the amount of training data, properties of the dataset, or the exact training setup (e.g., training from scratch or transfer learning).

In particular, the techniques described herein may be used for training generative adversarial neural networks (GANs). A GAN includes a generator neural network and a discriminator neural network. The generator receives a latent code (random numbers) and applies parameters learned during training to the latent code to generate output data, such as an image. The discriminator acts as an adaptive loss function that is used during training of the generator. Training data of the discriminator includes example output data (real data) that the output data produced by the generator (generated data) should be consistent with. The discriminator determines if the generated data appears similar to the real data included in the training data. For example, when the generator is trained to generate images of human faces, the discriminator judges if the generated human faces appear similar to example images of human faces (e.g., real images). A discriminator augmentation technique provides a wide range of augmentations to prevent the discriminator from overfitting, while ensuring that the augmentations do not leak to generated data.

Figure 1A:
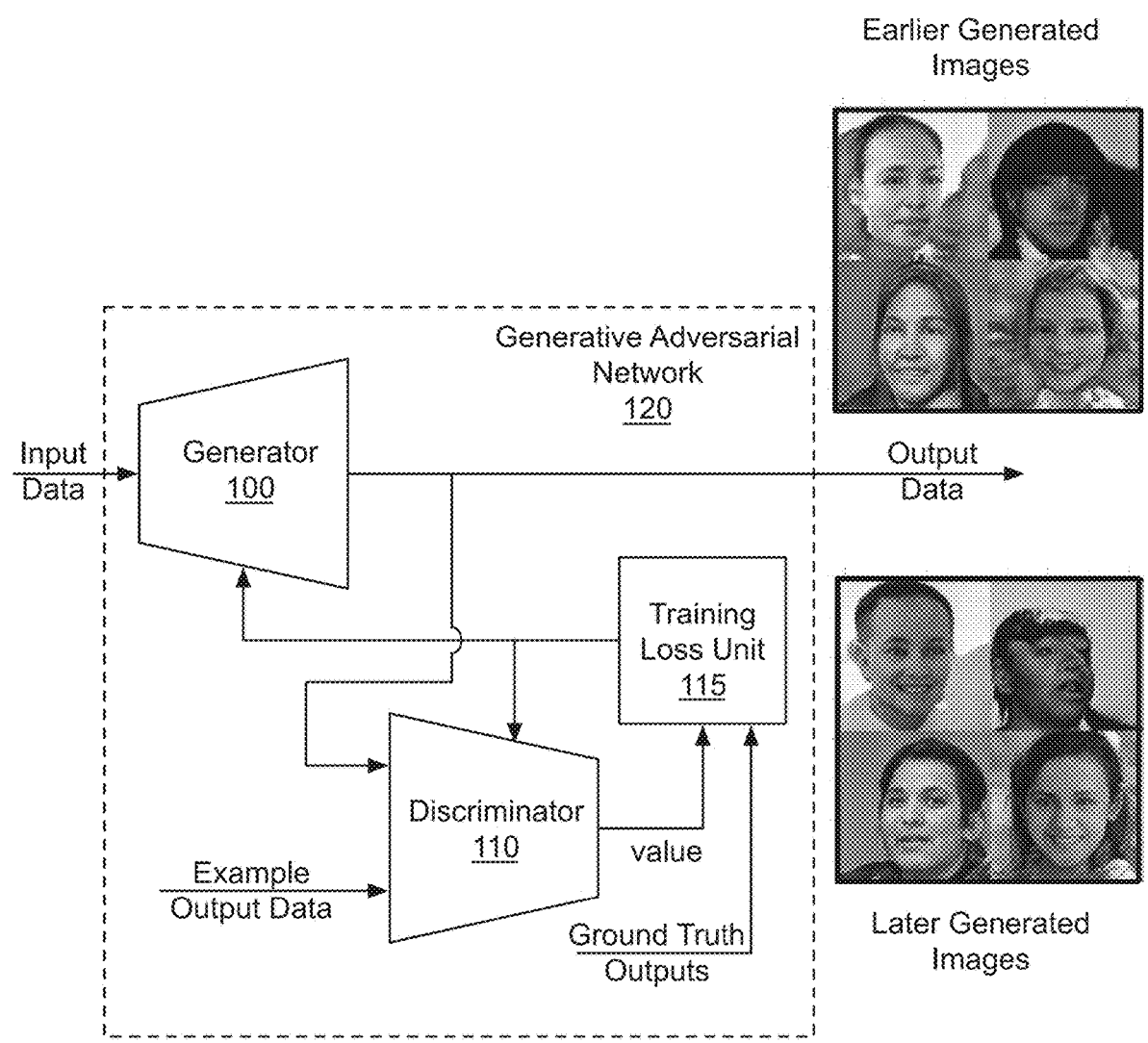
FIG. 1A illustrates a block diagram of a GAN training framework, in accordance with an embodiment.

FIG. 1A illustrates a block diagram of a GAN training framework, in accordance with an embodiment. The GAN 120 may be implemented by a program, custom circuitry, or by a combination of custom circuitry and a program. For example, the GAN 120 may be implemented using a GPU, CPU, or any processor capable of performing the operations described herein. Furthermore, persons of ordinary skill in the art will understand that any system that performs the operations of the GAN 120 is within the scope and spirit of embodiments of the present invention.

The GAN 120 includes a generator (neural network) 100, a discriminator (neural network) 110, and a training loss unit 115. The topologies of both the generator 100 and discriminator 110 may be modified during training. The GAN 120 may operate in an unsupervised setting or in a conditional setting. The generator 100 receives input and produces output data. Depending on the task, the output data may be an image, audio, video, or other types of data (configuration setting). In an embodiment, training mimics a "two-player game" with the generator 100 and the discriminator 110 operating as first and second players, respectively. In an embodiment, the generator 100 learns to generate data that is judged by the discriminator 110 as real or generated. In other words, the game is for the generator 100 to fool the discriminator 110 into believing the generated data is real.

In an embodiment, the training is performed over one or more iterations, where each iteration consists of multiple phases executed in an alternating fashion. In the first phase, parameters of the discriminator 110 are learned while the discriminator 110 receives generated output data produced by the generator 100. The discriminator 110 is trained to indicate that the generated output data is generated and not real. In the second phase, the discriminator 110 receives example output data (e.g., real images of human faces) and the parameters are updated as the discriminator 110 is trained indicate that the example output data is real and not generated. In an embodiment, the ground truth outputs indicate that the example output data is real (not generated) and that the generated data is not real. In the third phase, parameters of the generator 100 are adjusted (while the discriminator 110 parameters are fixed), as the generator 100 learns to generate output data that the discriminator 110 indicates is consistent with the example output data. In an embodiment, transfer learning is performed and training begins using a generator and a discriminator that are already trained for a different task.

As shown in FIG. 1A, earlier generated images of human faces may include some realistic characteristics (e.g., eyes, mouth, nose, hair), but are inconsistent with real images of human faces. The discriminator 110 indicates that the earlier generated images are inconsistent with the example output data used to train the discriminator 110. Later generated images produced later during training of the generator 100 are more consistent with real images of human faces.

In an embodiment, the discriminator 110 outputs a continuous value indicating how closely the output data matches the example output data. For example, in an embodiment, the discriminator 110 outputs a first training stimulus (e.g., high value, TRUE, first state) when the output data is determined to match the example output data and a second training stimulus (e.g., low value, FALSE, second state) when the output data is determined to not match the example output data. The training loss unit 115 adjusts parameters (weights) of the generator and the discriminator 120 based on the output of the discriminator 110. In an embodiment, the training loss unit 115 adjusts the parameters to reduce differences between the values and ground truth outputs.

When the generator 100 is trained for a specific task, such as generating images of human faces, the discriminator 110 outputs a high value when the output data is an image of a human face. The output data generated by the generator 100 is not required to be identical to the example output data for the discriminator 110 to determine the output data matches the example output data. In the context of the following description, the discriminator 110 determines that the output data matches the example output data when the output data is similar to any of the example output data. Training may continue to adjust the parameters of the discriminator and/or generator by providing the generated output data and the example output data to the discriminator and evaluating the output values.

In a conditional setting, the input data for the GAN 120 may include other data, such as an image, a classification label, segmentation contours, and other (additional) types of data (distribution, audio, etc.). After training, the additional data may be used as an explicit way to control the output of the generator, for example to generate images that correspond to a specific choice of the classification label. The additional data may be specified in addition to a random latent code, or the additional data may replace the random latent code altogether.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
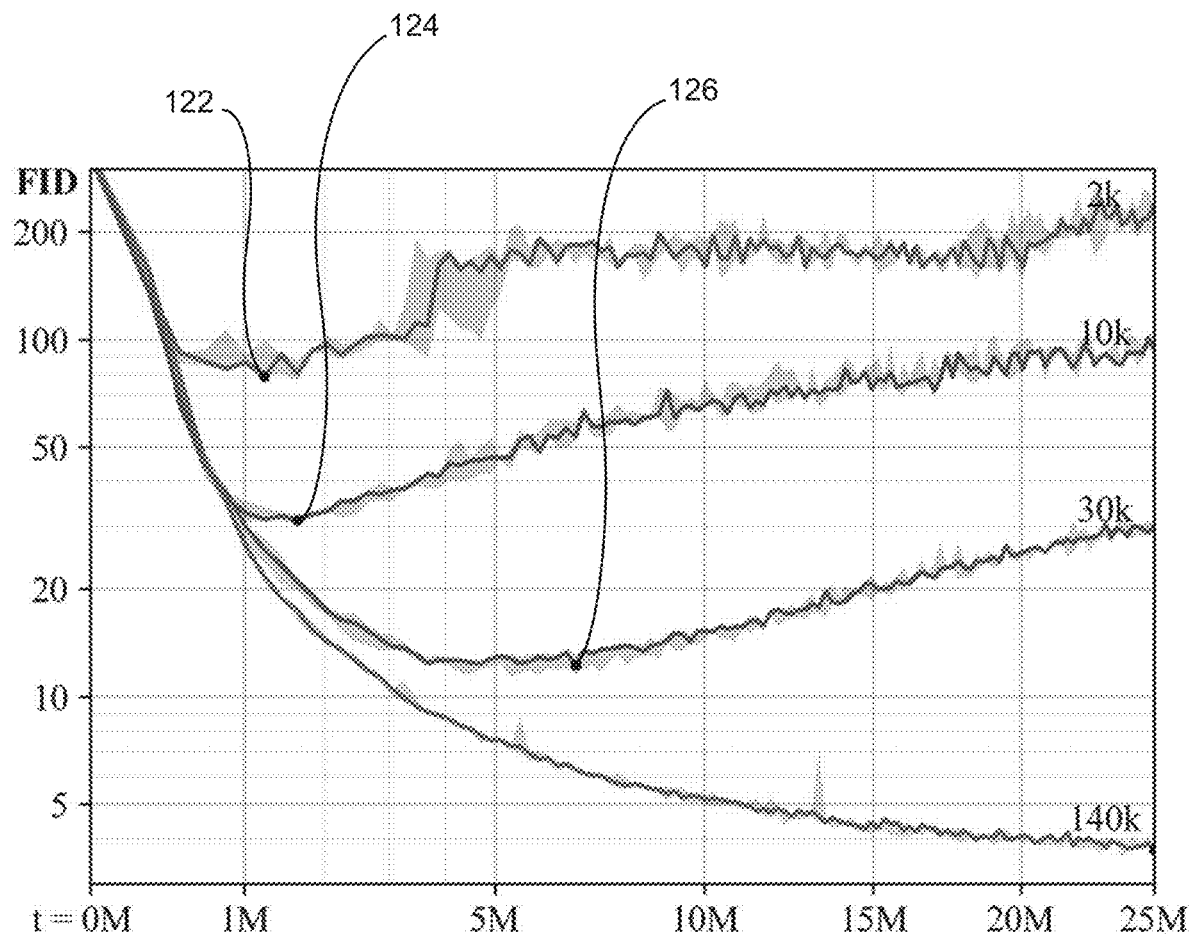
FIG. 1B illustrates a graph of convergence for various amounts of GAN training data using a prior art technique.

FIG. 1B illustrates convergence for various amounts of GAN training data using a prior art technique. The different curves on the graph correspond to different training dataset sizes used to train a GAN. A vertical axis indicates a Fréchet inception distance (FID) and a horizontal axis corresponds to the number of training samples (i.e., real images) shown to the discriminator. The training dataset is input to the discriminator repeatedly (in randomized order) until a fixed number of training samples have been processed. The FID measures the difference between the generated images and the real images, with a lower value associated with greater similarity. For a training dataset size of 140 k, the FID steadily improves as the training progresses. In contrast, training dataset sizes of 30 k, 10 k, and 2 k begin to improve and then degrade as the training continues. Specifically, the 2 k, 10 k, and 30 k size training dataset begins to degrade at points 122, 124, and 126, respectively. The less data in the training dataset, the earlier the FID begins to rise. In contrast, as described further herein, when the discriminator augmentation technique is used to train the GAN, a steady improvement over the entire course of the training is achieved—even for reduced training dataset sizes.

Figure 1C:
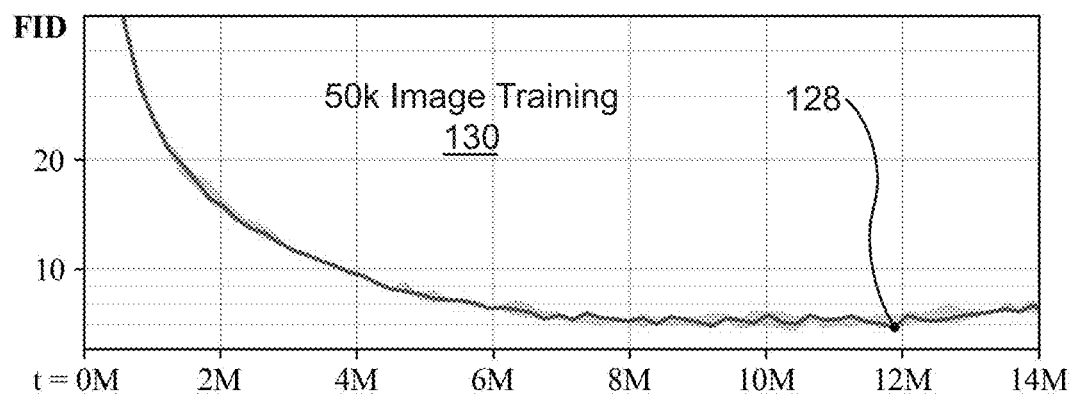
FIG. 1C illustrates GAN training progress using a prior art technique.
Figure 1C:
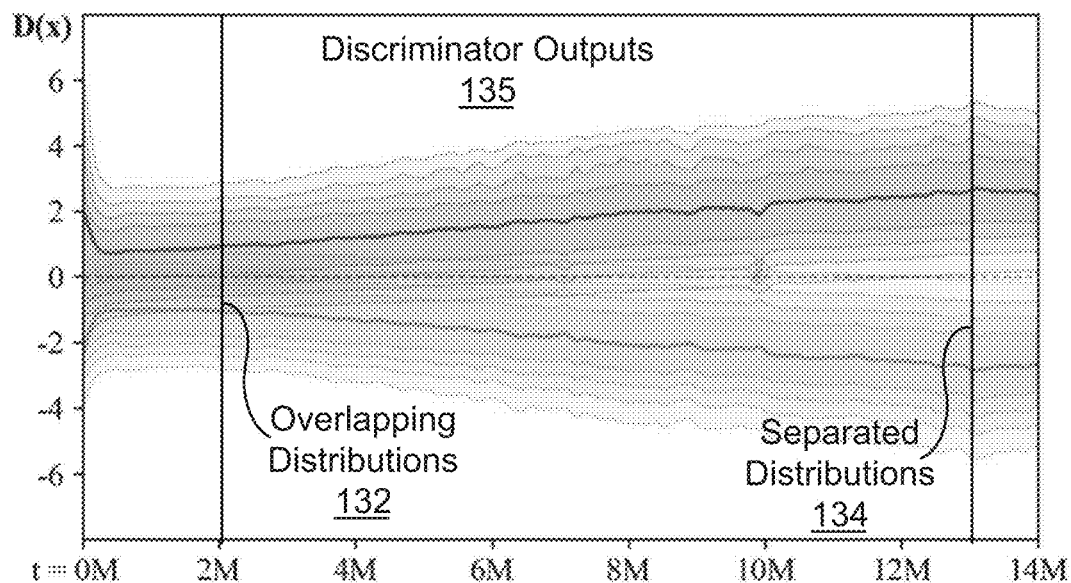
Figure 1C:
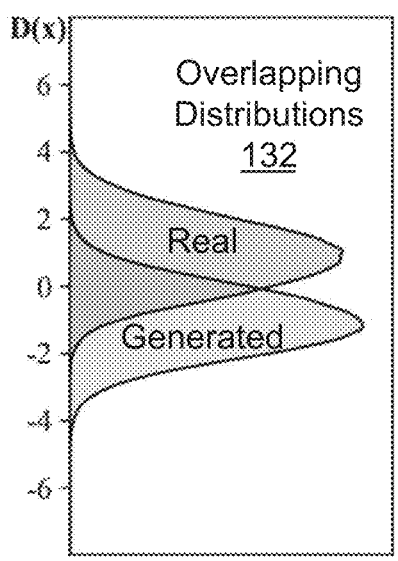
Figure 1C:
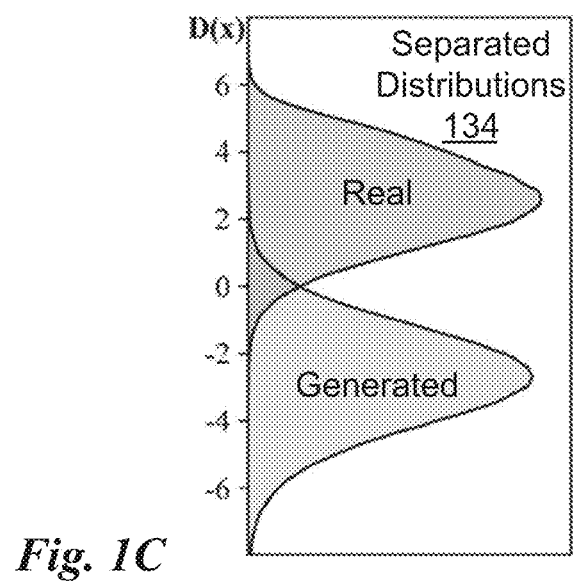

FIG. 1C illustrates GAN training progress using a prior art technique. The graph for 50 k image training 130 shows improving FID until point 128 where progress reverses. Discriminator outputs 135 show the values D(x) produced in response to inputs x during the training. At 2M training samples the values output by the discriminator are overlapping distributions 132 indicating real vs generated images, where negative values indicate generated images and positive values indicate real images. The overlapping distributions 132 at 2M training samples are shown in the graph below with an overlapping region centered around D(x)=0. As the training continues, at 13M training samples the distributions 134 drift apart, coinciding with the FID beginning to rise. The separation continues to increase for the training samples beyond 13M.

The real and generated distributions overlap initially but drift further and further apart as the discriminator becomes more and more confident, and the point where FID starts to deteriorate coincides with the loss of sufficient overlap between distributions. This is a strong indication of overfitting, evidenced further by the drop in accuracy (FID) measured for a separate validation set. The discriminator augmentation technique employs versatile augmentations that prevent the discriminator from becoming overly confident.

By definition, any augmentation that is applied to the training dataset will be inherited into the generated images as a result of training the generator. Recently, balanced consistency regularization (bCR) is proposed as a solution that is not supposed to leak augmentations to the generated images. Consistency regularization states that two sets of augmentations, applied to the same input image, should yield the same output. Consistency regularization terms are used for the discriminator loss, and discriminator consistency is enforced for both real and generated images, whereas no augmentations or consistency loss terms are applied when training the generator. As such, bCR effectively strives to generalize the discriminator by making it blind to the augmentations used in the CR term. However, meeting this goal opens the door for leaking augmentations, because the generator will be free to produce images containing the augmentations without any penalty. Indeed, bCR does suffer from leakage, and thus does not provide a high-quality solution for training a GAN with limited data.

Instead of using separate CR loss terms, a stochastic discriminator augmentation technique evaluates the discriminator using only augmented images. Similarly, when training the generator, the feedback that the generator receives from the discriminator is based on evaluating the discriminator using augmented versions of the generated images. The possibility of using only augmented images has received little attention, possibly because at first glance it is not obvious if it even works: if the discriminator never sees what the training images really look like, it is not clear if the discriminator can guide the generator properly. In the following, conditions under which the stochastic discriminator augmentation technique will not leak an augmentation to the generated images are determined, as further described in conjunction with FIGS. 2D, 3B, and 3C, and a full pipeline may be implemented based on the conditions.

Figures 2A, 2B:
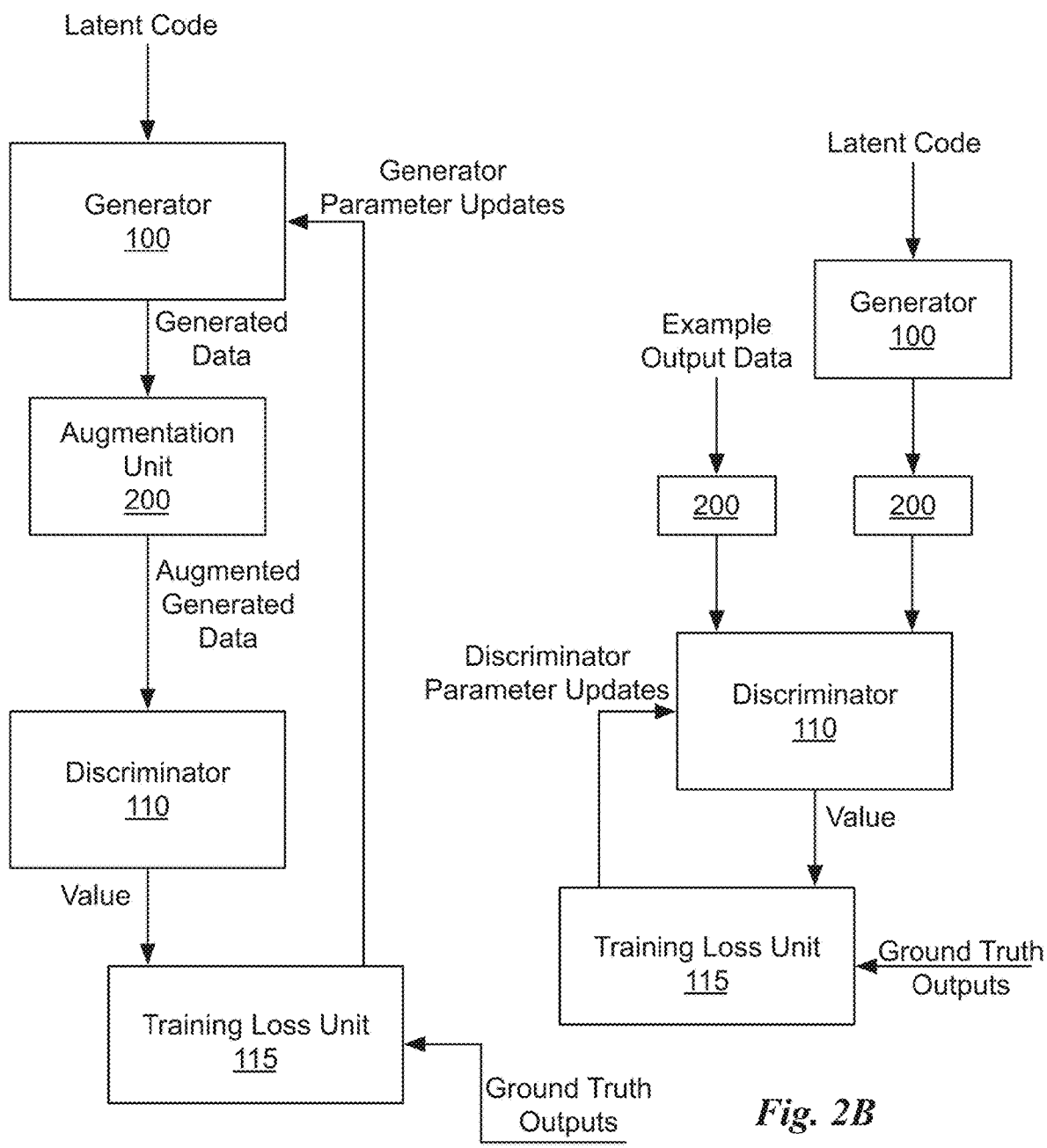
FIG. 2A illustrates a block diagram of an example augmentation training configuration suitable for use in implementing some embodiments of the present disclosure.
FIG. 2B illustrates a block diagram of an example augmentation training configuration suitable for use in implementing some embodiments of the present disclosure.

FIG. 2A illustrates a block diagram of an example augmentation training configuration suitable for use in implementing some embodiments of the present disclosure. The output data generated by the generator 100 is processed by an augmentation unit 200 before being input to the discriminator 110. In an embodiment, one or more augmentation units 200 are executed in conjunction with the discriminator 110 within the GAN 120. The training loss unit 115 updates the parameters of the generator 100 based on the values output by the trained discriminator 110. In an embodiment, the augmentation operators implemented by the augmentation unit 200 are one or more invertible transformations, as further described herein. In an embodiment, the updates are computed via backpropagation and the augmentation operators are differentiable.

Discriminator augmentation performed by the augmentation unit 200 can be understood as putting distorting, perhaps even destructive goggles on the discriminator 110, and asking the generator 100 to produce samples that cannot be distinguished from the example output data (e.g., training dataset) when viewed through the goggles. Conceptually, the augmentation unit 200 corresponds to the goggles. In an embodiment, the augmentations are stochastic.

FIG. 2B illustrates another block diagram of an example adaptive augmentation training configuration suitable for use in implementing some embodiments of the present disclosure. The discriminator 110 is trained using the example output data processed by the augmentation unit 200 and using generated output data produced by the generator 100 that is also processed by the augmentation unit 200. The discriminator 110 processes the augmented example output data and the augmented generated output data to produce values. The training loss unit 115 provides discriminator parameter updates based on the values and whether the input to the discriminator 110 corresponds to the augmented example output data or augmented generated output data. In an embodiment, the updates are computed to reduce differences between the values and ground truth outputs.

In an embodiment, a training objective implemented by the training loss unit 115 is for a distribution x of the generated output data to match the distribution y of the example output data as closely as possible. The generator 100 is trained with the goal of generating output data that have the distribution x=y. Furthermore, for image generation, when the augmentation unit 200 applies the augmentation operator $\mathcal{T}$ to all inputs to the discriminator 110, both real and generated images, the training objective drives the distribution $\mathcal{T}$ x of the augmented generated images to match the distribution $\mathcal{T}$ y of the augmented real images, $\mathcal{T}$ x=$\mathcal{T}$ y. When the augmentation operator is invertible, only one distribution x exists that, when augmented, produces the distribution $\mathcal{T}$ x. In other words, there is one distribution x for which $\mathcal{T}^{-1}\mathcal{T}$ x=x. The generator 100 training implicitly undoes the corruptions introduced by the augmentation unit 200 and finds the correct distribution, as long as the corruption process is represented by an invertible transformation of probability distributions over the data space. In other words, $\mathcal{T}$ x=$\mathcal{T}$ y will necessarily imply that x=y if the augmentation operator is invertible, but the implication is not true if the operator is non-invertible. In the context of the following description, augmentation operators that represent such an invertible transformation are referred to as non-leaking. Invertible augmentation operators are referred to as non-leaking because the augmentations will not leak into the generated data. When the transformation represented by the augmentation operator is invertible—considering the distribution as a whole, the distribution of the output data generated by the generator converges to become more similar to the distribution of the real images, x=y. The augmentation operator corresponds to data distributions and specifies the augmentation that is applied to individual samples of the input data (e.g., individual images).

The power of the invertible transformations performed by the augmentation unit 200 is that conclusions about the equality or inequality of the underlying datasets may be drawn by observing only the augmented dataset without the generator 100 and/or discriminator 110 seeing the dataset without augmentation. It is crucial to understand that this does not mean that augmentations performed on individual images would need to be undoable. For instance, an augmentation as extreme as setting the input image to zero 90% of the time is invertible in the probability distribution sense: it would be easy, even for a human, to reason about the original distribution by ignoring black images until only 10% of the images remain. On the other hand, random rotations chosen uniformly from {0°, 90°, 180°, 270°} are not invertible: it is impossible to discern differences among the orientations after the augmentation.

Figure 2C:
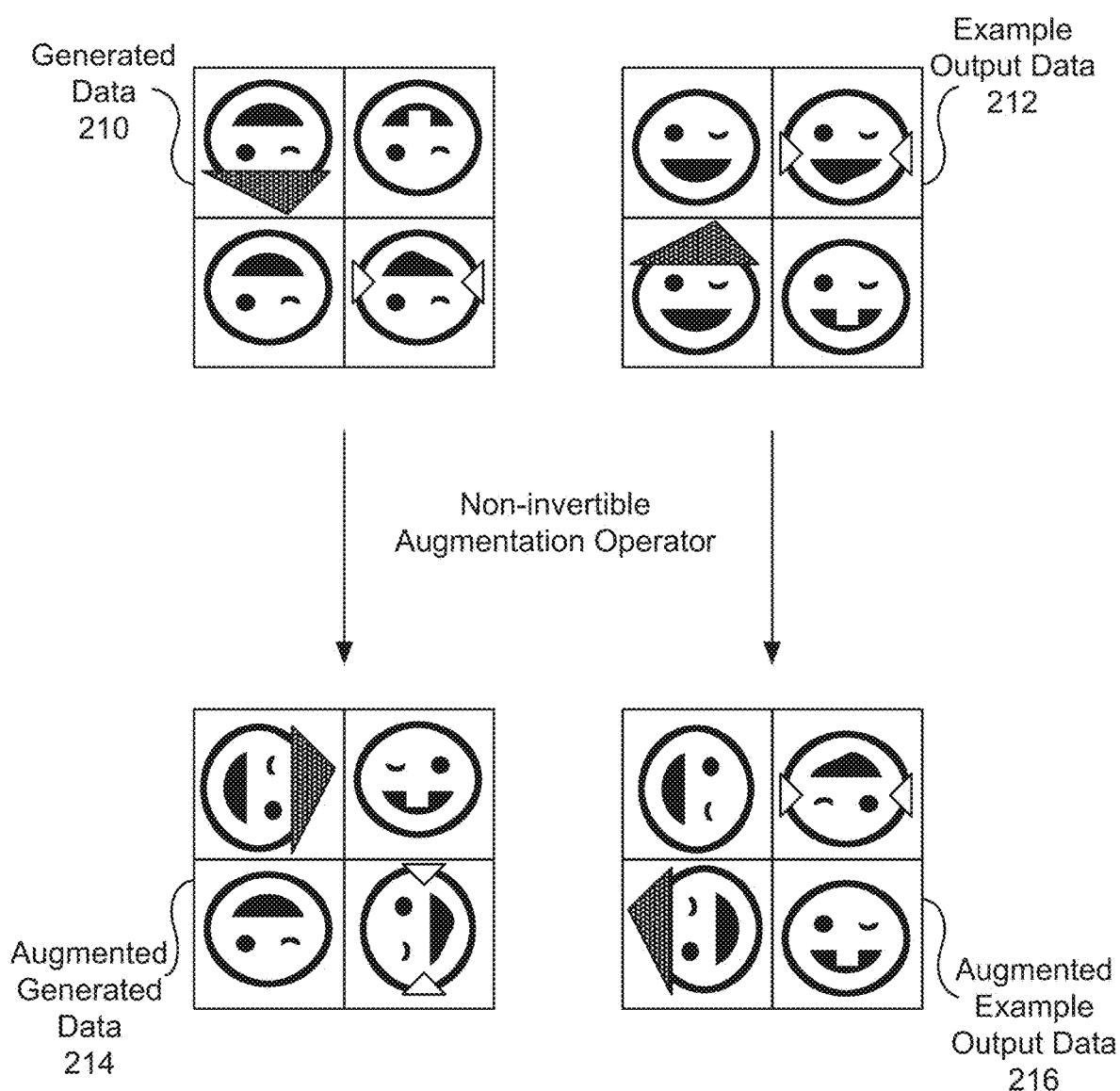
FIG. 2C illustrates transformations using a non-invertible augmentation operator, in accordance with an embodiment.

FIG. 2C illustrates transformations using a non-invertible augmentation operator, in accordance with an embodiment. The random rotations chosen with uniform probability from {0°, 90°, 180°, 270°} are an augmentation operator corresponding to a non-invertible transformation that produces a set of augmented data. The example output data 212 includes upright faces that are augmented to produce augmented example output data 216. The same set of augmentations are applied to generated data 210 that erroneously includes only upside-down faces to produce augmented generated data 214. The generator should be trained to produced generated data 210 that is consistent with the example output data 212. However, because the distribution of the augmented generated data 214 matches that of the augmented example output data 216, the discriminator will incorrectly conclude that the generated data 210 is consistent with the example output data 216. Specifically, the uniform probability of 25% for each of the four different rotations produce a uniform distribution of 25% for both augmented generated data 214 and augmented example output data 216 regardless of what the original orientations are and whether they match between the set of generated data 210 and the set of example output data 212.

Figure 2D:
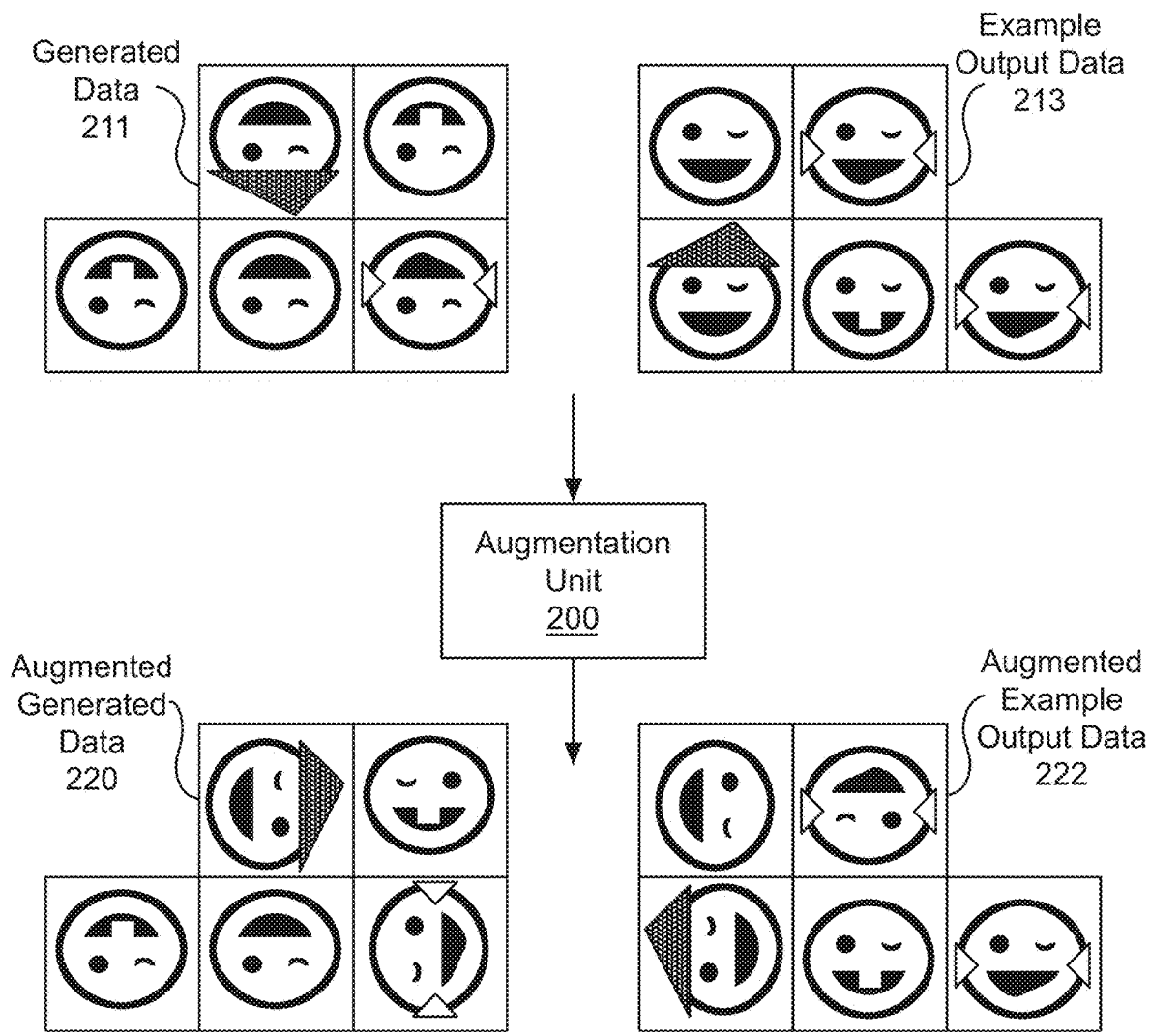
FIG. 2D illustrates transformations using an invertible augmentation operator, in accordance with an embodiment.

FIG. 2D illustrates transformations using an invertible augmentation operator, in accordance with an embodiment. In contrast with the non-invertible rotation transformation shown in FIG. 2C, the rotation transformation can be made invertible by changing the probability from uniform to a non-uniform. The augmentation unit 200 processes generated data 211 and example output data 213 using an invertible rotation transformation to produce augmented generated data 220 and augmented example output data 222, respectively. The probability of performing an augmentation is set to 80%, so that each of the four rotations is 20%, 20%, 20%, 20% for 0°, 90°, 180°, 270°, respectively. Because no augmentation occurs at 20% probability, the resulting probability for rotating by 0° is 40%.

The relative occurrence of the 0° rotation is increased when the augmentation is skipped, and now the augmented distributions can match only if the generated data 211 have correct orientation that is consistent with the example output data 213. Similarly, many other stochastic augmentations can be designed to be non-leaking on the condition that the augmentation is skipped with a non-zero probability. For example, such augmentations include geometric warps, color transforms, deterministic mappings (e.g., basis transformations), additive noise, transformation groups (e.g., image or color space rotations, flips and scaling), and projections (e.g., cutout). Furthermore, compositing non-leaking augmentations in a fixed order yields an overall non-leaking augmentation. In an embodiment, a probability value p is provided as an input to the augmentation unit 200 to control application of the augmentations, where $0 \leq p \leq 1$. When p<1, the transformation corresponding to the augmentation operator will be invertible.

Figure 2E:
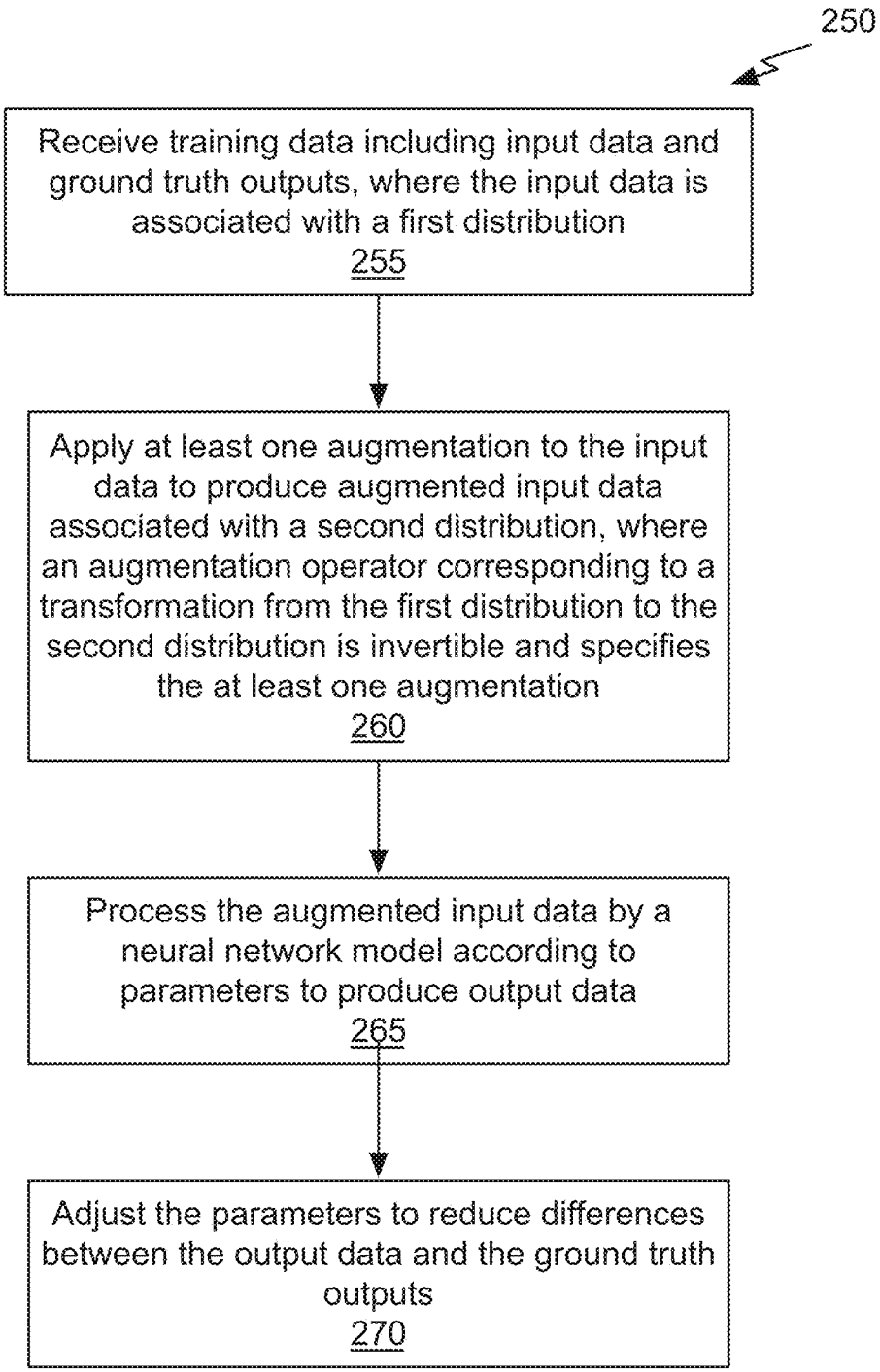
FIG. 2E illustrates a flowchart of a method using discriminator augmentation for training a neural network with limited data, in accordance with an embodiment.

FIG. 2E illustrates a flowchart of a method 250 using adaptive and/or stochastic discriminator augmentation for training a neural network with limited data, in accordance with an embodiment. Each block of method 250, described herein, comprises a computing process that may be performed using any combination of hardware, firmware, and/or software. For instance, various functions may be carried out by a processor executing instructions stored in memory. The method 250 may also be embodied as computer-usable instructions stored on computer storage media. The method 250 may be provided by a standalone application, a service or hosted service (standalone or in combination with another hosted service), or a plug-in to another product, to name a few. In addition, method 250 is described, by way of example, with respect to the GAN 120 of FIG. 1A and/or the training configurations shown in FIGS. 2A and/or 2B. However, this method may additionally or alternatively be executed by any one system, or any combination of systems, including, but not limited to, those described herein. For example, the method 250 may be used to train a neural network for a task such as a classification. Furthermore, persons of ordinary skill in the art will understand that any system that performs method 250 is within the scope and spirit of embodiments of the present disclosure.

At step 255, a neural network (e.g., a discriminator) receives training data including input data and ground truth outputs, where the input data is associated with a first distribution. In an embodiment, the neural network is the discriminator 110. In an embodiment, the input data comprises images and each image in the training data is augmented. In an embodiment, the at least one augmentation is randomly disabled based on a value (p) that defines the augmentation strength. In an embodiment, the at least one augmentation is differentiable. In an embodiment, the at least one augmentation is implemented as a sequence of different augmentations.

At step 260, at least one augmentation is applied to the input data to produce augmented input data associated with a second distribution, where an augmentation operator corresponding to a transformation from the first distribution to the second distribution is invertible and specifies the at least one augmentation. In an embodiment, the input data is output data produced by the generator 100. In an embodiment, the first distribution is the only such distribution for which applying the at least one augmentation to the input data associated with the first distribution results in an augmented distribution that matches the second distribution.

At step 265, the augmented input data is processed by the neural network according to parameters to produce output data. At step 270, the parameters are adjusted to reduce differences between the output data and the ground truth outputs. In an embodiment, the input data comprises a first subset of generated data and a second subset of real data and the first subset of generated data is produced by a generator neural network model based on second parameters. In an embodiment, the second parameters are adjusted to cause distributions of the first subset and the second subset to match more closely.

In an embodiment, the input data comprises a first subset of generated data and a second subset of real data, the output data comprises values indicating either a first state or a second state, and adjusting the parameters causes a first portion of the output data produced for the first subset to match the first state more closely and a second portion of the output data produced for the second subset to match the second state more closely. In other words, the distributions of real and generated input images match the respective distributions of the discriminator classification output produced for the augmented real and generated input images.

Figure 3A:
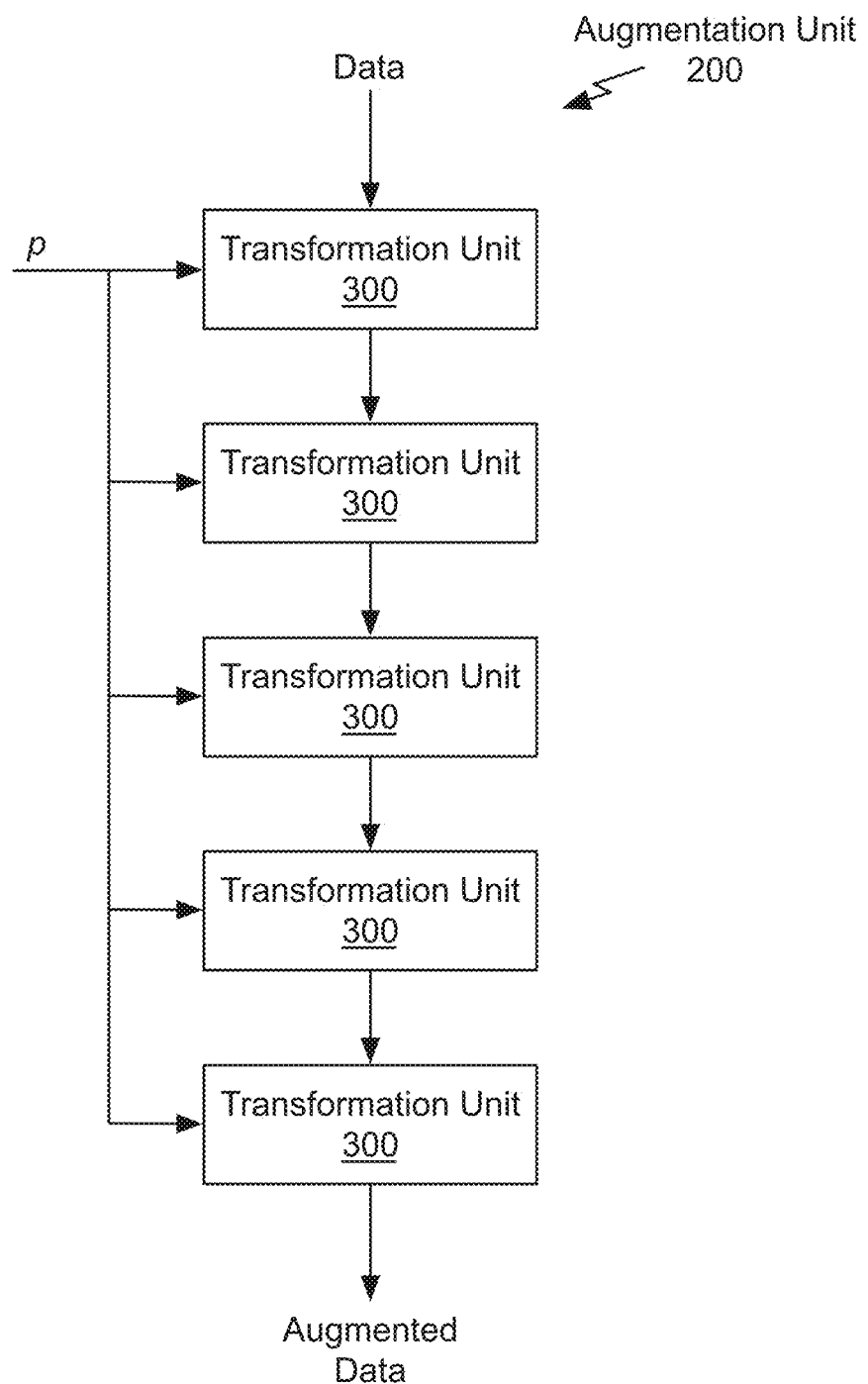
FIG. 3A illustrates the augmentation unit shown in FIGS. 2A and 2B, in accordance with an embodiment.

FIG. 3A illustrates the augmentation unit 200, in accordance with an embodiment. An augmentation pipeline within the augmentation unit 200 includes a sequence of transformation units 300 each of which is configured to apply a transformation to produce augmented data. In an embodiment, the augmentation unit 200 may include fewer or more transformation units 300. In an embodiment, the transformation units 300 are stochastic, i.e., they may produce different output when executed multiple times for the same input. The probability value p that is input to each transformation unit 300 controls the augmentation strength and ensures the transformation is invertible. In an embodiment, the augmentation unit 200 includes at least one transformation unit 300. In an embodiment, each transformation unit 300 may be configured to perform any one of N transformations. In another embodiment, each transformation unit 300 is configured to perform a specific one of the N transformations. In an embodiment, the N transformations may be grouped into 6 categories: pixel blitting (x-flips, 90° rotations, integer translation), more general geometric transformations, color transforms, image-space filtering, additive noise, and cutout. In an embodiment, during training, each image is shown to the discriminator 110 after being processed by the augmentation unit 200 using a pre-defined set of transformations in a fixed order. Because the augmentations are also used when training the generator 100, the augmentations should be differentiable for backpropagation when computing the generator parameter updates.

The strength of augmentations is controlled by the scalar $p \in [0,1]$, so that each transformation unit 300 applies the transformation with probability p or skips it with probability 1−p. In an embodiment, the transformation unit 300 is always performed on the data input to the transformation unit 300 and p is used to selectively output either the augmented data or data input to the transformation unit 300 according to probability p. In an embodiment, the same value of p is input to each transformation unit 300. In an embodiment, randomization according top is separately performed for each augmentation and for each image in a minibatch. Given that there are multiple transformation units 300 in the augmentation pipeline, even fairly small values of p make it very unlikely that the discriminator sees a clean image. Nonetheless, the generator 100 is guided to produce only clean images as long asp remains below a practical safety limit.

Unsurprisingly, using p=1 is likely to result in augmentations leaking to the output images of the generator 100. More specifically, experiments confirm that the aforementioned rotation by a random multiple of 90° should be skipped at least part of the time to best train the generator 100. When p is too high, the generator 100 cannot know which way the generated images should face and ends up picking one of the possibilities at random. As could be expected, the problem does not occur exclusively in the limiting case of p=1. In practice, the training setup is poorly conditioned for nearby values as well due to finite sampling, finite representational power of the networks, inductive bias, and training dynamics. Based on experiments with several different kinds of augmentations, when p remains below ~0.85, the generated images are always correct, i.e., there are no leaks.

The effectiveness of stochastic discriminator augmentation is evaluated by performing exhaustive sweeps over p for different augmentation categories and dataset sizes. The optimal augmentation strength depends heavily on the amount of training data. Therefore, relying on any fixed p may not be the best choice for different sized datasets. Also, the training improvement may vary for different augmentation categories.

Figure 3B:
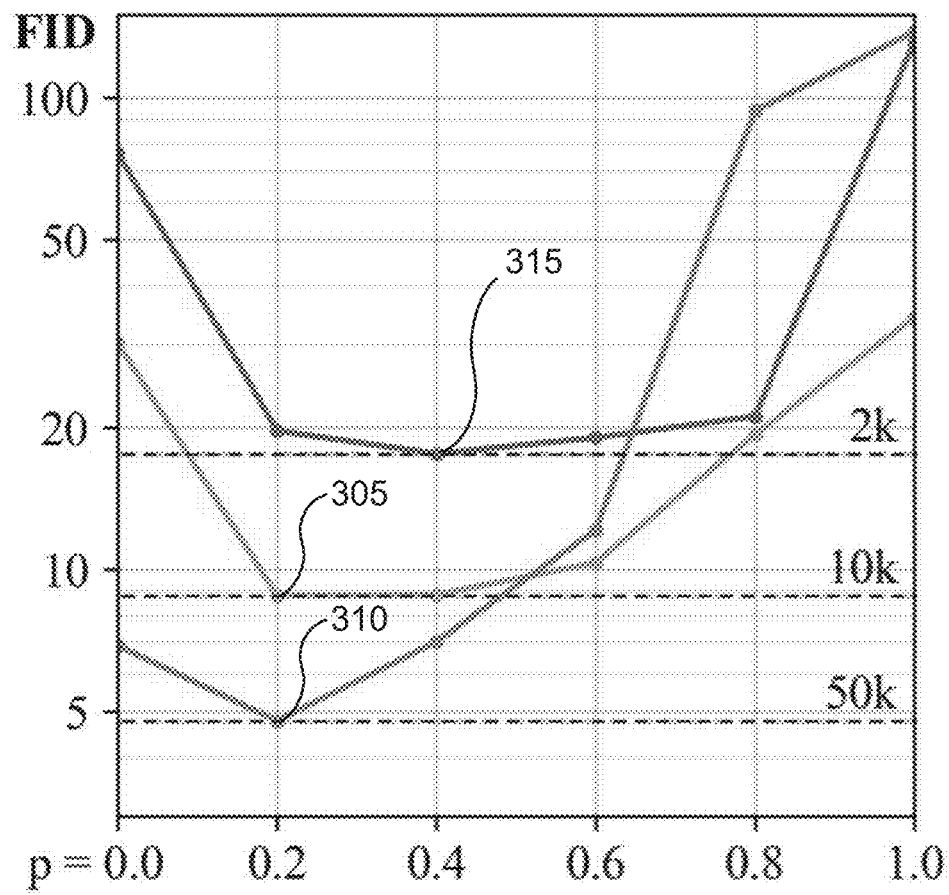
FIG. 3B illustrates a graph of FID for different values of p and various amounts of GAN training data, in accordance with an embodiment.

FIG. 3B illustrates a graph of FID for different values of p and various amounts of GAN training data, in accordance with an embodiment. For a 2 k training set, the best results may be obtained using strong augmentations. Specifically, a value of p=0.4 corresponds to the lowest FID at point 315. The curves also indicate some of the augmentations becoming leaky as p approaches a value of one. With 10 k and 50 K training sets, the higher values of p were less helpful and a value of p=0.2 corresponds to the lowest FIDs at points 305 and 310, respectively. With 140 k training set (not shown) the situation is markedly different: all augmentations were harmful, so p=0 provides the best results. In practice, the sensitivity to dataset size mandates a costly grid search to determine the best value of p for each dataset size.

Preferably, manual tuning of the augmentation strength would be avoided and instead the augmentation strength should be dynamically controlled during training based on the degree of overfitting. One way of quantifying overfitting is to use a separate validation set and observe its behavior relative to the training set. For the limited sized training datasets, overfitting begins when the validation set starts behaving increasingly like the generated images. This is a quantifiable effect, albeit with the drawback of requiring a separate validation set when training data may already be in short supply. As shown in FIG. 1C, discriminator 110 output values for real and generated images diverge symmetrically around zero as the overfitting worsens. The divergence can be quantified without a separate validation set.

The discriminator output values are denoted as $D_{train}$, $D_{validation}$, and $D_{generated}$ for the training set, validation set, and generated images, respectively, and their mean over N consecutive minibatches by $\mathbb{E}[\cdot]$. In an embodiment, N=4, which corresponds to 4×64=256 images. Two plausible overfitting heuristics can be defined:

$$r_v = \frac{\mathbb{E}[D_{train}] - \mathbb{E}[D_{validation}]}{\mathbb{E}[D_{train}] - \mathbb{E}[D_{generated}]} \quad \text{Eq. (1)}$$

$$r_t = \mathbb{E}[\text{sign}(D_{train})]$$

For both heuristics, r=0 means no overfitting and r=1 indicates complete overfitting, and the goal is to adjust the augmentation probability p so that the chosen heuristic matches a suitable target value. The first heuristic, $r_v$, expresses the output of the discriminator for a validation set relative to the training set and generated images. Because the first heuristic assumes the existence of a separate validation set, it is primarily used as a comparison to evaluate the second heuristic. The second heuristic, $r_t$, estimates the portion of the training set for which positive values are output by the discriminator 110. Both $r_v$ and $r_t$ are effective in preventing overfitting, and they both improve the results over the best fixed p found using grid search (see FIG. 3B). In an embodiment, the second heuristic is far less sensitive to the chosen hyperparameters than the obvious alternative of looking at $\mathbb{E}[D_{train}]$ directly.

The augmentation strength p may be controlled as follows. In an embodiment, p is initialized to zero and adjusted once every N minibatches based on the chosen overfitting heuristic. If the heuristic indicates too much/little overfitting, p may be adjusted by incrementing/decrementing by a fixed adjustment size (i.e., pre-determined amount). In an embodiment, the determination is based on comparing the value of the heuristic to a pre-defined target value. If value of the heuristic is higher than the target value, it is determined that there is too much overfitting, and vice versa. In an embodiment, the adjustment size is set so that p can rise from 0 to 1 sufficiently quickly, e.g., in 500 k images. The value of p may be clamped to 0, meaning that it may not become negative after decrementing. Dynamically controlling the augmentation strength may be referred to as adaptive discriminator augmentation (ADA). The ADA mechanism does not require changes to loss functions or network architectures and is applicable both when training from scratch and when fine-tuning an existing GAN on another dataset.

Figure 3C:
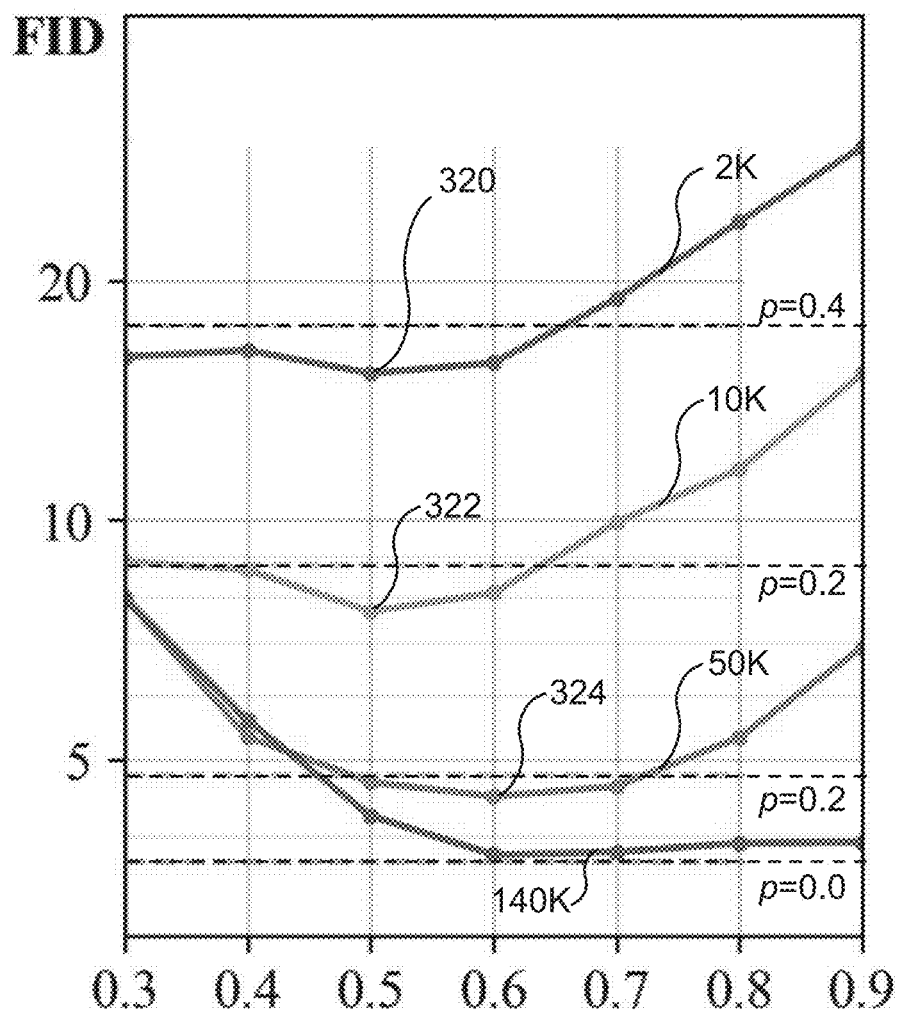
FIG. 3C illustrates a graph of FID for different target values for adaptive discriminator augmentation and various amounts of GAN training data, in accordance with an embodiment.

FIG. 3C illustrates a graph of FID for different target values (x-axis) for the $r_t$ heuristic and various amounts of GAN training data using adaptive discriminator augmentation, in accordance with an embodiment. In an embodiment, a chosen target value is 0.6 and the augmentation strength is adjusted based on the $r_t$ heuristic. The dashed lines show the optimal fixed value of p for each training dataset from FIG. 3B. When ADA is used for the 2 k training set, the best results are obtained at point 320 with a target value of 0.5. With 10 k and 50 K training sets, the target values of 0.5 and 0.6 correspond to the lowest FIDs at points 322 and 324, respectively. With 140 k training set, 0.6 provides the best results.

Figure 3D:
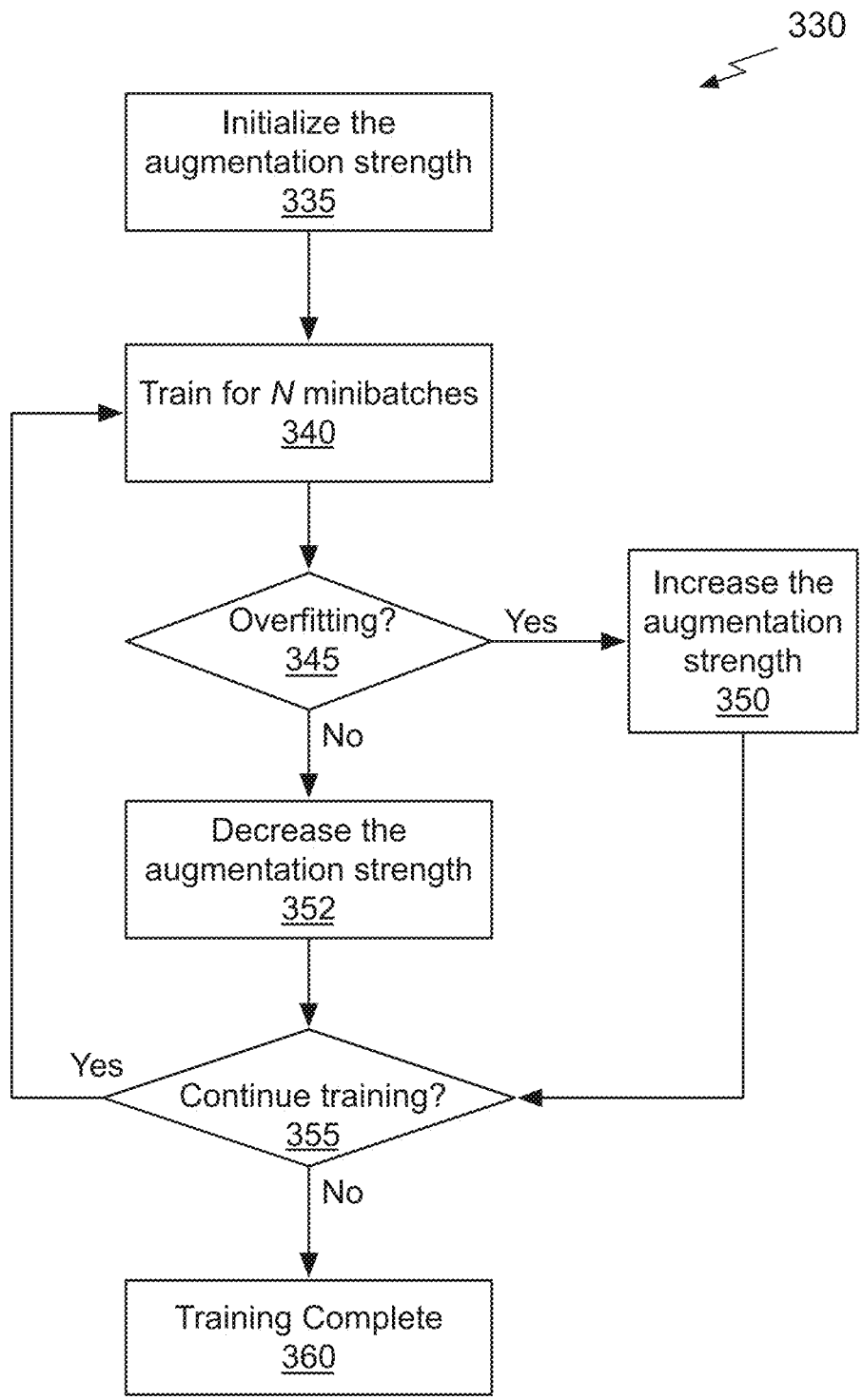
FIG. 3D illustrates a flowchart of a method using adaptive discriminator augmentation for training a neural network with limited data, in accordance with an embodiment.

FIG. 3D illustrates a flowchart of a method 330 using adaptive discriminator augmentation for training a neural network with limited data, in accordance with an embodiment. Each block of method 330, described herein, comprises a computing process that may be performed using any combination of hardware, firmware, and/or software. For instance, various functions may be carried out by a processor executing instructions stored in memory. The method 330 may also be embodied as computer-usable instructions stored on computer storage media. The method 330 may be provided by a standalone application, a service or hosted service (standalone or in combination with another hosted service), or a plug-in to another product, to name a few. In addition, method 330 is described, by way of example, with respect to the GAN 120 of FIG. 1A and/or the training configurations shown in FIGS. 2A and/or 2B. However, this method may additionally or alternatively be executed by any one system, or any combination of systems, including, but not limited to, those described herein. For example, the method 330 may be used to train a neural network for a task such as a classification. Furthermore, persons of ordinary skill in the art will understand that any system that performs method 330 is within the scope and spirit of embodiments of the present disclosure.

At step 335, the augmentation strength is initialized by setting p to a value (e.g., zero). At step 340, the neural network model is trained for N minibatches, where N is a positive integer. At step 345, if the neural network model being trained is overfitting, the method 330 proceeds to step 350. Otherwise, the method 330 proceeds to step 352 and decreases the augmentation strength before proceeding to step 355. At step 350, the augmentation unit 200 increases the augmentation strength before proceeding to step 355. In an embodiment, an adjustment size used to increase or decrease the augmentation strength is applied to p. In an embodiment, p is incremented or decremented by the augmentation unit 200 based on the output data produced by the neural network model for the N minibatches (e.g., $D_{train}$). In an embodiment, the output data produced by the neural network model for the N minibatches (e.g., $r_t$) is compared to a reference (e.g., a target value of 0.6) and p is adjusted based on the result of the comparison.

At step 355, the training loss unit 115 determines if training should continue, and if so, returns to step 340. Otherwise, training is complete. In an embodiment, training is completed when a loss computed by the training loss unit 115 is below a threshold value. In an embodiment, training is completed when the entire training dataset has been applied to the neural network model M times, where M is a pre-defined constant. In an embodiment, training is completed when a predetermined number of minibatches have been completed. In an embodiment, the neural network model comprises at least one of the generator 100 and the discriminator 110.

Figure 3E:
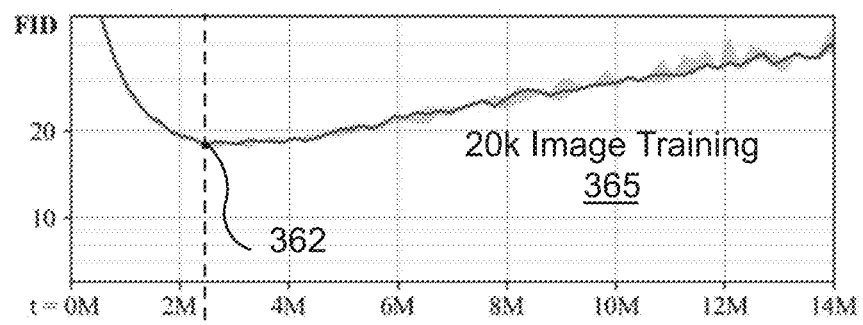
FIG. 3E illustrates improved GAN training progress using adaptive discriminator augmentation, in accordance with an embodiment.
Figure 3E:
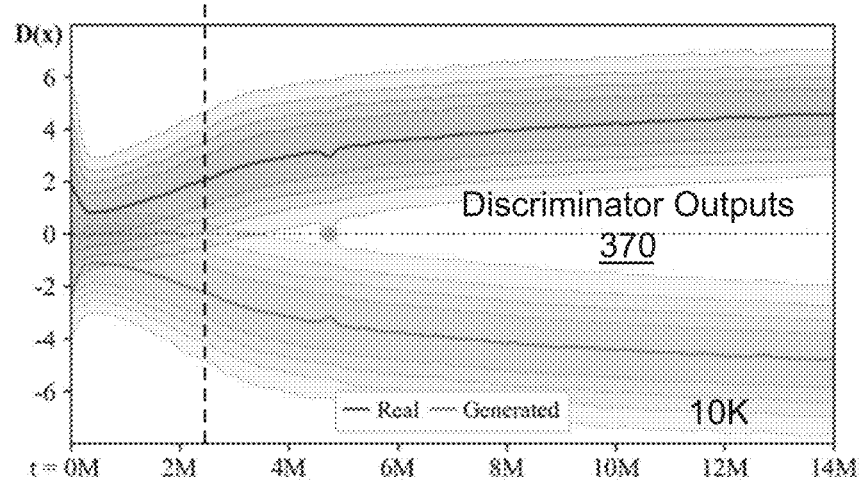
Figure 3E:
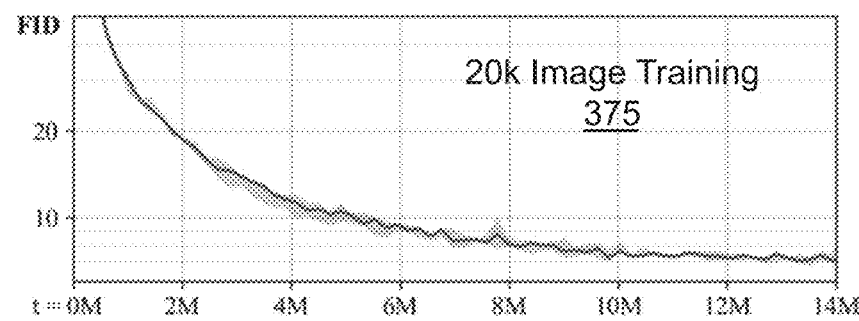
Figure 3E:
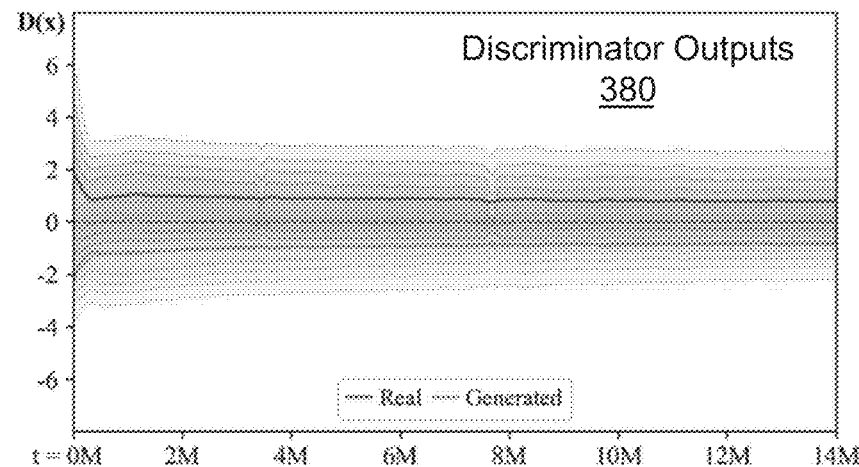

FIG. 3E illustrates improved GAN training progress using adaptive discriminator augmentation, in accordance with an embodiment. Similar to the graph for 50 k image training 130 shown in FIG. 1C, the graph for 20 k image training 365 is performed without any augmentation and FID improves until point 362 where progress begins to reverse. Similar to the discriminator outputs 135 shown in FIG. 1C, discriminator outputs 370 show the values D(x) generated during the training. Before point 362, the values output by the discriminator have overlapping distributions for real vs generated data. As the training continues after point 362, the discriminator output values separate.

In contrast, when ADA is used for the 20 k image training 375, the FID steadily improves over the entire course of the training and reaches a lower value than the non-augmented training 365 does at any point. Similarly, discriminator outputs 380 have overlapping distributions for real vs generated data throughout the training. Therefore, the overfitting that occurs during conventional training may be avoided when either stochastic discriminator augmentation or ADA is used during training, particularly when reduced size training datasets are used.

Data-driven generative modeling means learning a computational recipe for generating complicated data based purely on examples. In addition to playing a fundamental role in machine learning, generative models have several uses within applied machine learning research as priors, regularizers, and so on. Generative models advance the capabilities of computer vision and graphics algorithms for analyzing and synthesizing realistic imagery. Stochastic discriminator augmentation (SDA) and ADA reliably stabilize training and vastly improve the training results for generative models when training data is limited. SDA and ADA may be used to train high-quality generative models using significantly less data than required by existing approaches. In particular, when ADA is used, generator output steadily improves throughout the training regardless of the training set size and overfitting does not occur. Without augmentations, gradients that the generator receives from the discriminator become very simplistic over time—the discriminator starts to pay attention to only a handful of features, and the generator is free to create otherwise nonsensical images.

SDA and ADA make it easier to train high-quality generative models with custom sets of data, thereby significantly lowing the barrier for applying GAN-type models in many applied fields of research. For instance, modeling the space of possible appearance of biological specimens (tissues, tumors, etc.) is a growing field of research that appears to chronically suffer from limited high-quality data. Overall, generative models hold promise for increased understanding of the complex and hard-to-pinpoint relationships in many real-world phenomena.

Parallel Processing Architecture

Figure 4:
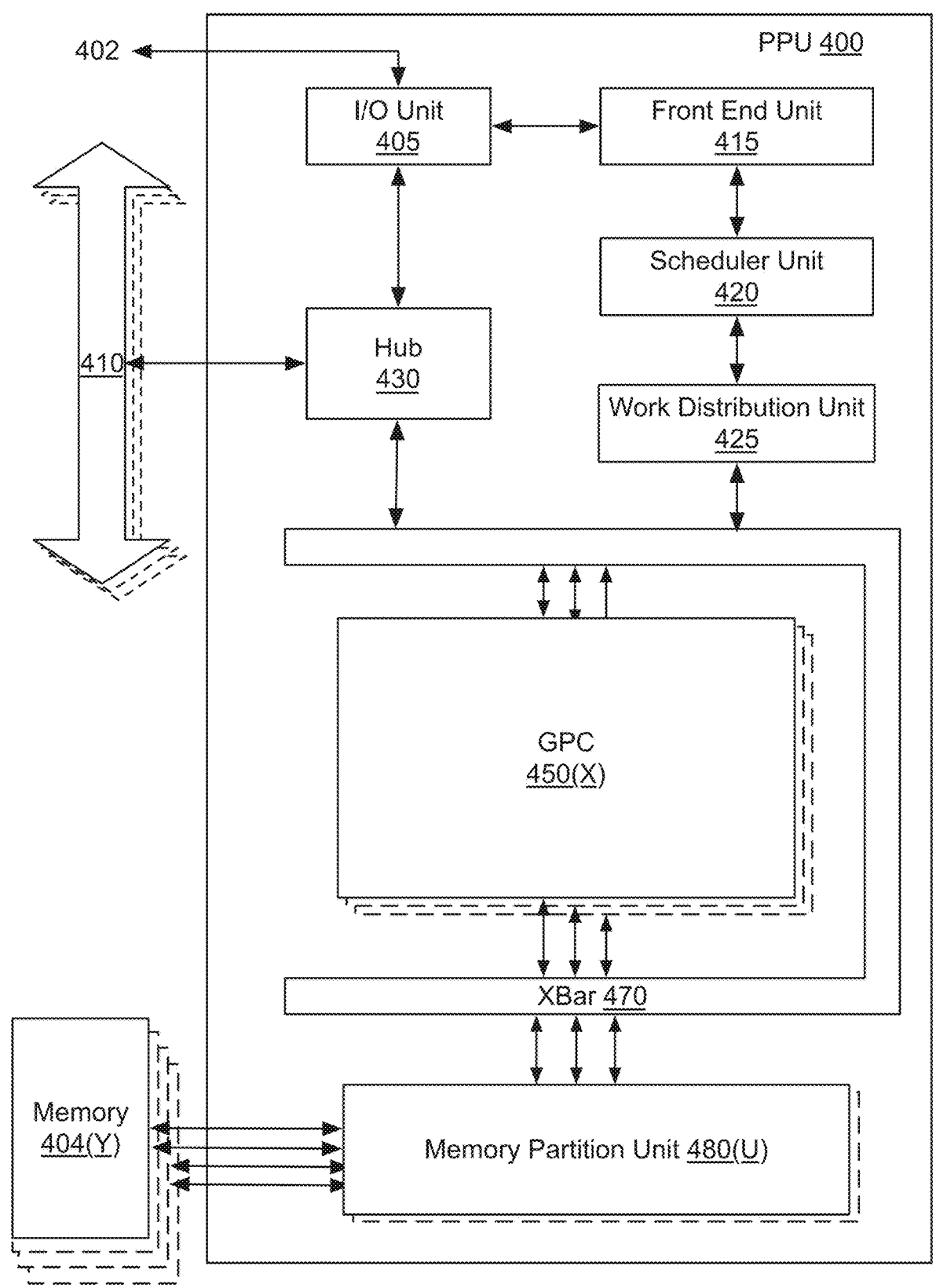
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the GAN 120. The PPU 400 may be used to implement one or more of the generator 100, discriminator 110, augmentation unit 200, and training loss unit 220 shown in FIGS. 1A, 2A, 2B, and 3A. The PPU 400 may be configured to perform the method 150 and/or 250.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
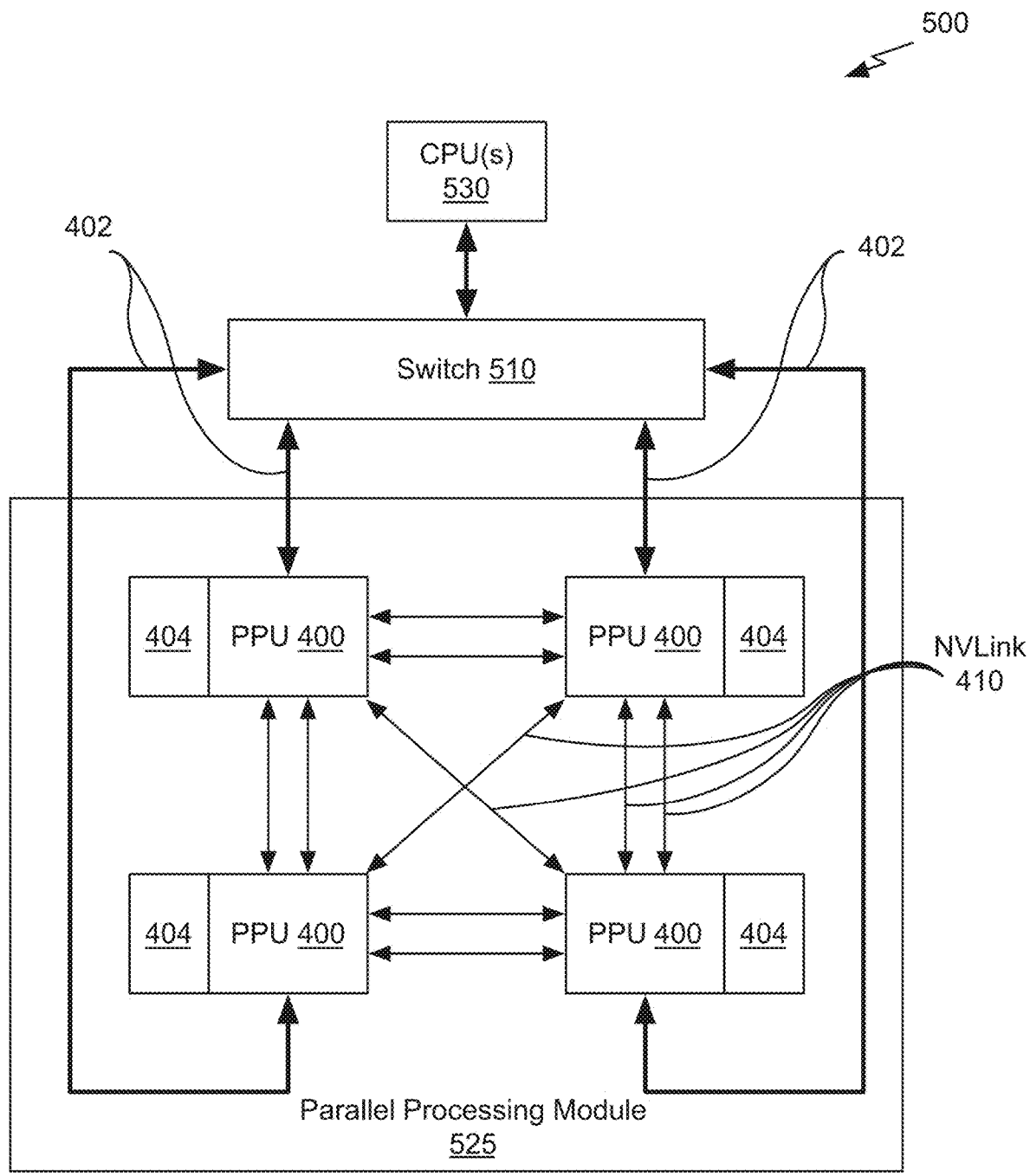
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 250 shown in FIG. 2E and/or the method 330 shown in FIG. 3D. The processing system 500 includes a CPU 530, switch 510, and multiple PPUs 400, and respective memories 404.

Figure 5B:
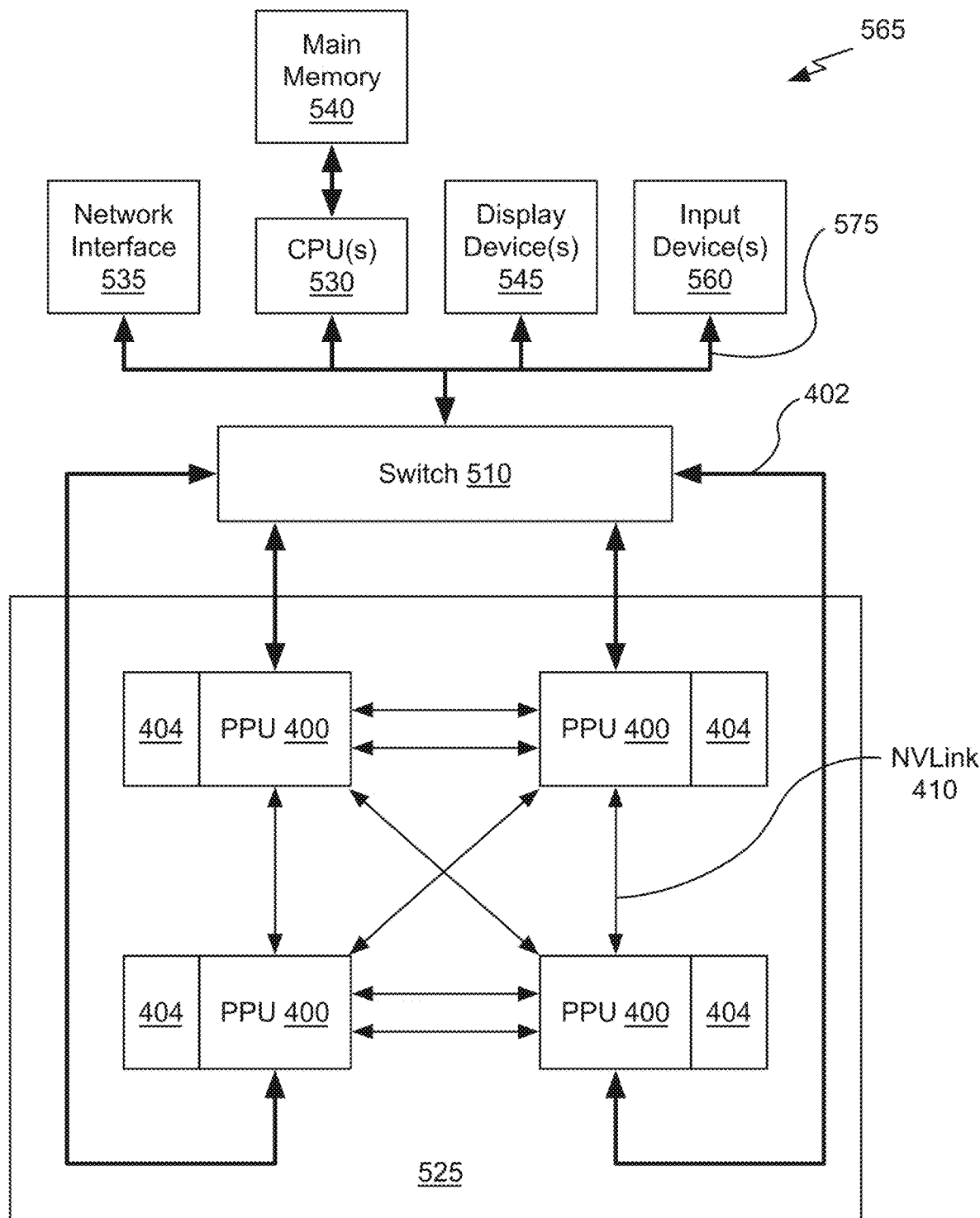
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 250 shown in FIG. 2E and/or the method 330 shown in FIG. 3D.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
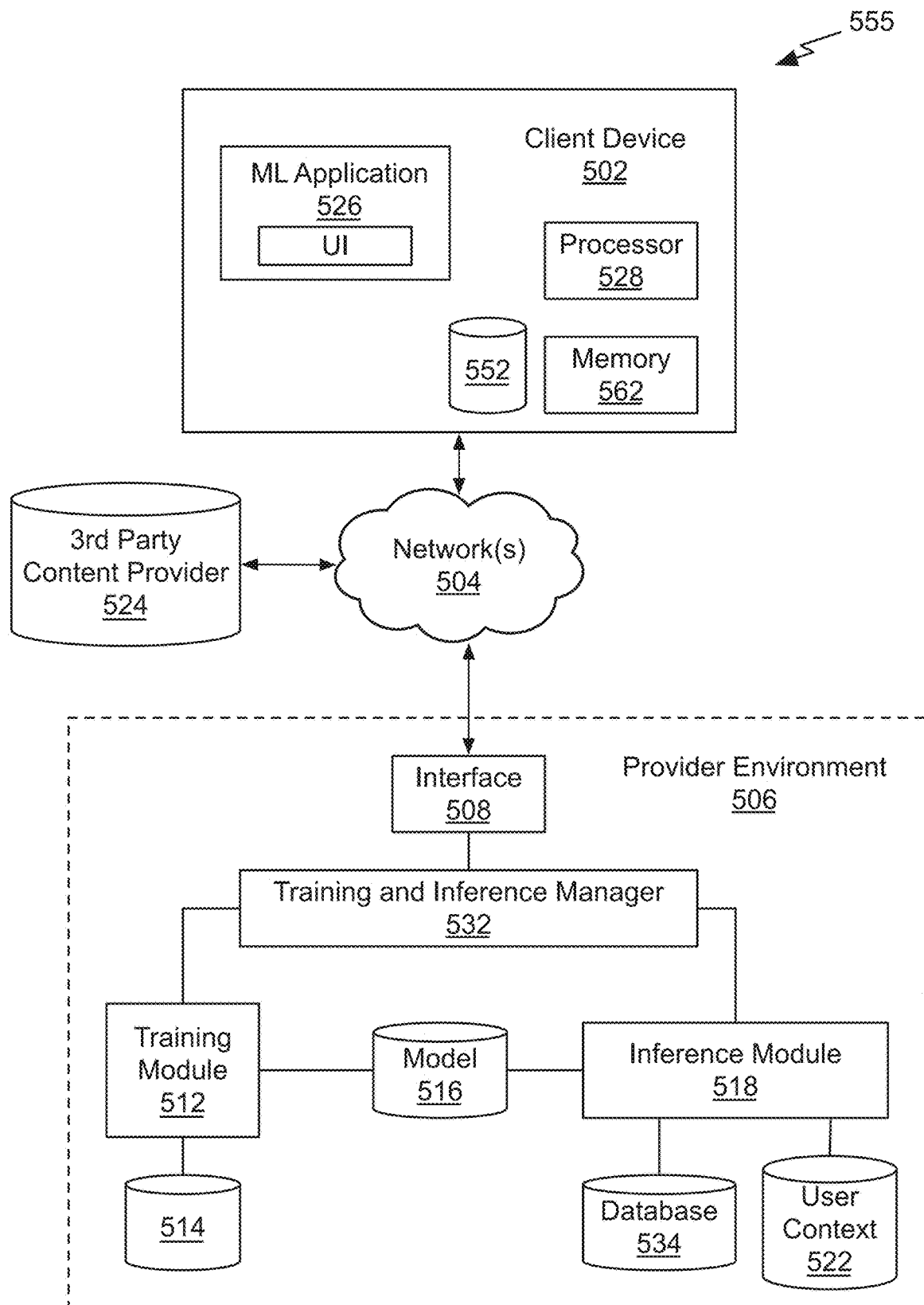
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Example Streaming System

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Figure 6:
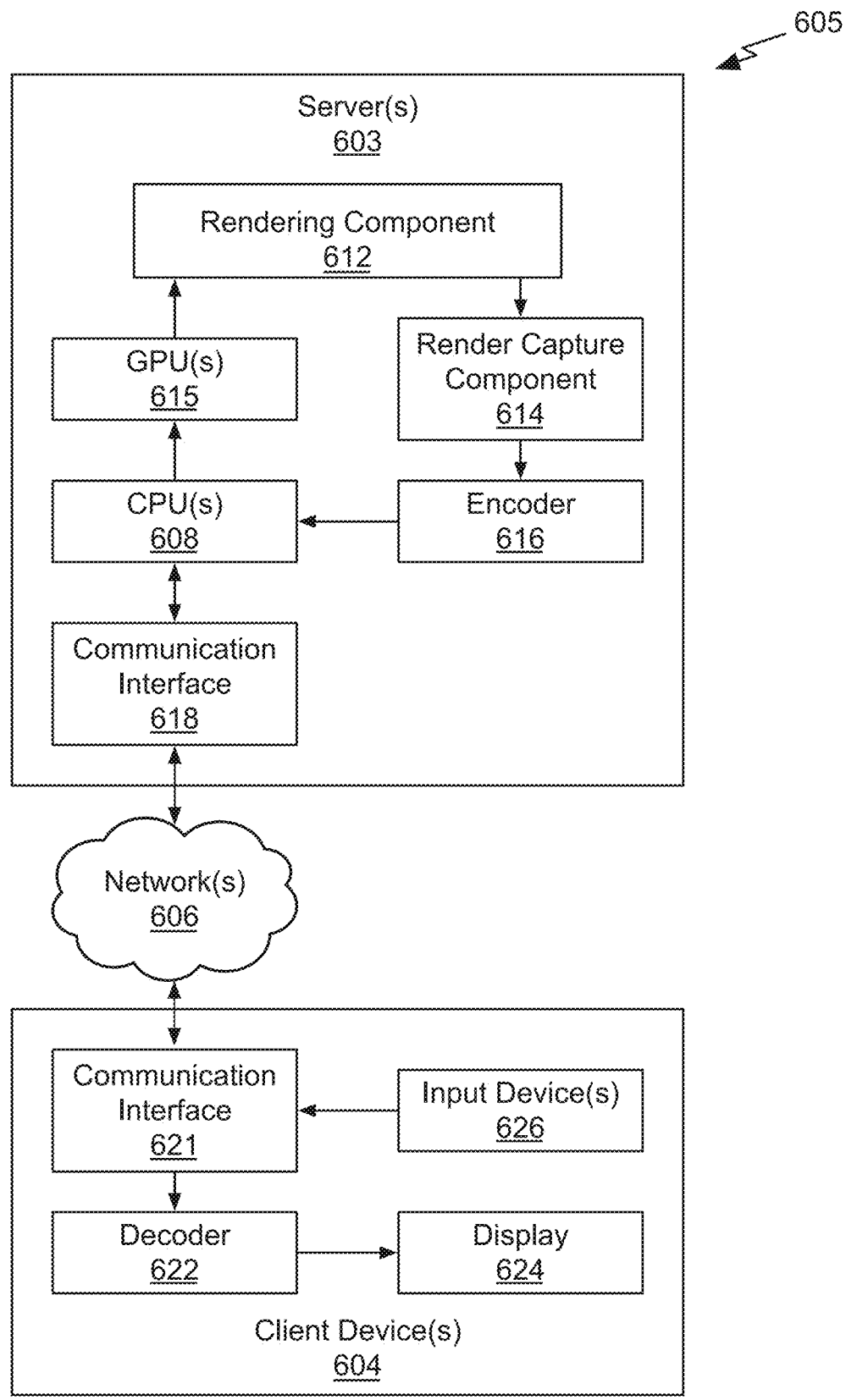
FIG. 6 illustrates an exemplary streaming system suitable for use in implementing some embodiments of the present disclosure.

FIG. 6 is an example system diagram for a streaming system 605, in accordance with some embodiments of the present disclosure. In an embodiment, the streaming system 605 is a game streaming system. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for training a neural network model comprising a generator and a discriminator, comprising:
    receiving training data including example output data and ground truth outputs;
    processing latent codes, according to parameters, by the generator to produce generated data;
    applying at least one augmentation to the generated data to produce augmented generated data, wherein an augmentation operator is invertible and specifies the at least one augmentation;
    processing only the augmented generated data by the discriminator to produce values; and
    adjusting the parameters to reduce differences between the values and the ground truth outputs.

2. The computer-implemented method of claim 1, wherein the example output data is associated with a first distribution and the augmentation operator transforms the first distribution into an augmented distribution that matches a second distribution associated with the augmented generated data.

3. The computer-implemented method of claim 1, wherein the example output data comprises a first subset of output data produced by the generator and a second subset of real data, the ground truth outputs comprise values indicating either a first state or a second state, and adjusting the parameters causes a first portion of the generated data to match the first state more closely and a second portion of the generated data to match the second state more closely.

4. The computer-implemented method of claim 1, wherein the generated data comprises images and the at least one augmentation is disabled for producing the augmented generated data.

5. The computer-implemented method of claim 1, wherein applying further comprises randomly disabling application of the at least one augmentation for a portion of the generated data based on an augmentation strength value.

6. The computer-implemented method of claim 5, further comprising dynamically adjusting the augmentation strength value based on an overfitting heuristic over the course of repeated processing of the latent codes and applying.

7. The computer-implemented method of claim 6, wherein the augmentation strength value is increased or decreased based on a comparison between the overfitting heuristic and a pre-defined target value.

8. The computer-implemented method of claim 6, wherein at least a portion of the generated data is compared to a reference to produce a result and the augmentation strength value is adjusted based on the result.

9. The computer-implemented method of claim 1, wherein the at least one augmentation is differentiable.

10. The computer-implemented method of claim 1, wherein the at least one augmentation is implemented as a sequence of different augmentations.

11. The computer-implemented method of claim 1, wherein the example output data comprises a first subset of output data produced by the generator based on second parameters and a second subset of real data.

12. The computer-implemented method of claim 11, further comprising, after adjusting the parameters, adjusting the second parameters to cause distributions of the first subset and the second subset to match more closely.

13. The computer-implemented method of claim 1, wherein the discriminator is trained by:
   applying at least one augmentation to the example output data to produce augmented example output data;
   processing the augmented example output data by the discriminator according to second parameters to produce second values; and
   adjusting the second parameters to reduce differences between the second values and the ground truth outputs.

14. The computer-implemented method of claim 1, wherein the neural network model is used for accelerating applications including at least one of autonomous vehicle platforms, deep learning, high-accuracy speech, image, and text recognition, intelligent video analytics, molecular simulations, drug discovery, disease diagnosis, weather forecasting, big data analytics, astronomy, molecular dynamics simulation, financial modeling, robotics, factory automation, real-time language translation, online search optimizations, or personalized user recommendations.

15. The computer-implemented method of claim 1, wherein at least one of the steps of processing of the latent codes, applying, processing the augmented generated data, or adjusting are performed on at least a portion of a graphics processing unit.

16. A system, comprising:
   a memory that stores training data including example output data and ground truth outputs; and
   a processor that is coupled to the memory and implements a neural network model comprising a generator and a discriminator, wherein the neural network model is trained by:
      processing latent codes, according to parameters, by the generator to produce generated data;
      applying at least one augmentation to the generated data to produce augmented generated data, wherein an augmentation operator is invertible and specifies the at least one augmentation;
      processing only the augmented generated data by the discriminator to produce values; and
      adjusting the parameters to reduce differences between the values and the ground truth outputs.

17. The system of claim 16, wherein the example output data is associated with a first distribution and the augmentation transforms the first distribution into an augmented distribution that matches a second distribution associated with the augmented generated data.

18. A non-transitory computer-readable media storing computer instructions that, when executed by one or more processors, cause the one or more processors to train a neural network model comprising a generator and a discriminator by performing the steps of:
   receiving training data including example output data and ground truth outputs;
   processing latent codes, according to parameters, by the generator to produce generated data;
   applying at least one augmentation to the generated data to produce augmented generated data, wherein an augmentation operator is invertible and specifies the at least one augmentation;
   processing only the augmented generated data by the discriminator to produce values; and
   adjusting the parameters to reduce differences between the values and the ground truth outputs.

19. The non-transitory computer-readable media of claim 18, wherein the example output data is associated with a first distribution and the augmentation operator transforms the first distribution into an augmented distribution that matches a second distribution associated with the augmented generated data.

20. The non-transitory computer-readable media of claim 18, wherein applying further comprises randomly disabling application of the at least one augmentation for a portion of the generated data based on an augmentation strength value.

* * * * *